(12) United States Patent
Kato

(10) Patent No.: US 7,438,868 B2
(45) Date of Patent: Oct. 21, 2008

(54) HONEYCOMB STRUCTURE AND CATALYTIC CONVERTER

(75) Inventor: Yasushi Kato, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 524 days.

(21) Appl. No.: 10/954,210

(22) Filed: Oct. 1, 2004

(65) Prior Publication Data

US 2005/0163676 A1  Jul. 28, 2005

(30) Foreign Application Priority Data

Oct. 17, 2003  (JP) .............................. 2003-357586

(51) Int. Cl.
*B01D 50/00* (2006.01)
*B01D 53/34* (2006.01)

(52) U.S. Cl. .................. 422/180; 422/177; 422/179
(58) Field of Classification Search .................. 422/177, 422/179, 180
See application file for complete search history.

(56) References Cited

U.S. PATENT DOCUMENTS

| 5,063,029 A * | 11/1991 | Mizuno et al. ............... 422/175 |
| 2002/0192426 A1* | 12/2002 | Ichikawa et al. ............ 428/116 |
| 2004/0166035 A1* | 8/2004 | Noda et al. .................. 422/180 |

FOREIGN PATENT DOCUMENTS

| DE | 102 61 880 A1 | 7/2004 |
| EP | 1 118 750 A1 | 7/2001 |
| EP | 1 413 345 A1 | 4/2004 |
| EP | 1 415 779 A1 | 5/2004 |
| FR | 2 801 070 A1 | 5/2001 |
| GB | 2238004 A * | 5/1991 |
| JP | A-53-137326 | 11/1978 |
| JP | A-58-051210 | 3/1983 |
| JP | A-58-053621 | 3/1983 |
| JP | A-09-155203 | 6/1997 |
| JP | B2-3390698 | 1/2003 |
| JP | A-2003-138962 | 5/2003 |
| WO | WO 03/008165 A1 | 1/2003 |
| WO | WO 03/009938 A1 * | 2/2003 |
| WO | WO 03/011427 A1 | 2/2003 |

* cited by examiner

*Primary Examiner*—Walter D. Griffin
*Assistant Examiner*—Lessanework T Seifu
(74) *Attorney, Agent, or Firm*—Oliff & Berridge, PLC

(57) ABSTRACT

A catalytic converter has a honeycomb catalyst body, a housing and a holding material, wherein the honeycomb catalyst body has, as the catalyst carrier, a honeycomb structure having an inner wall(s) which is (are) provided so as to divide the large number of cells into two or more cell blocks and which has (have) a thickness larger than the thickness of the partition walls, and the exhaust gas-incoming section and purified gas-outgoing section of the housing are divided by diaphragms into two or more exhaust gas-incoming passages and two or more purified gas-outgoing passages, and the two or more cell blocks of the honeycomb structure are allowed to communicate with the corresponding two or more exhaust gas-incoming passages and corresponding two or more purified gas-outgoing passages of the housing. This catalytic converter has a compact structure and can effectively prevent the reduction in engine output caused by exhaust gas interference, without adoption of complicated exhaust pipe structure, or increase in vehicle body weight, or increase in cost.

6 Claims, 16 Drawing Sheets

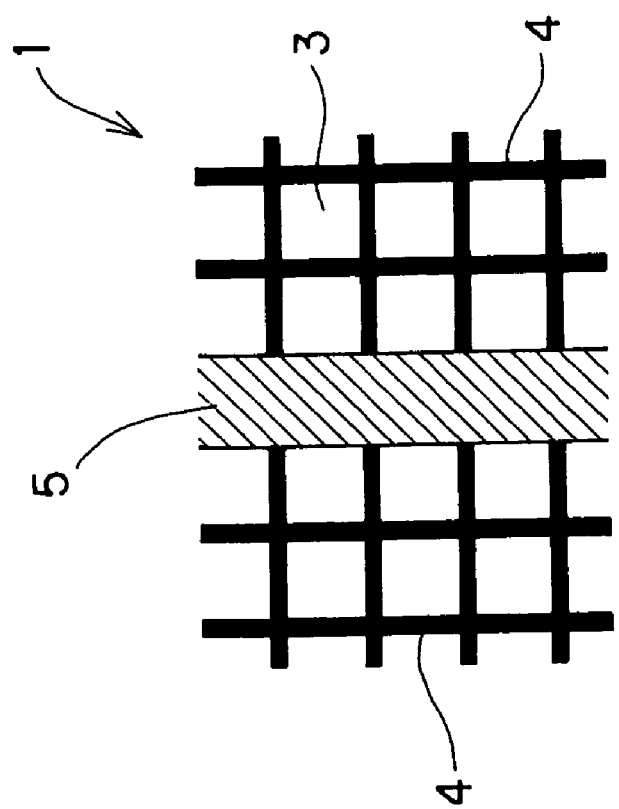
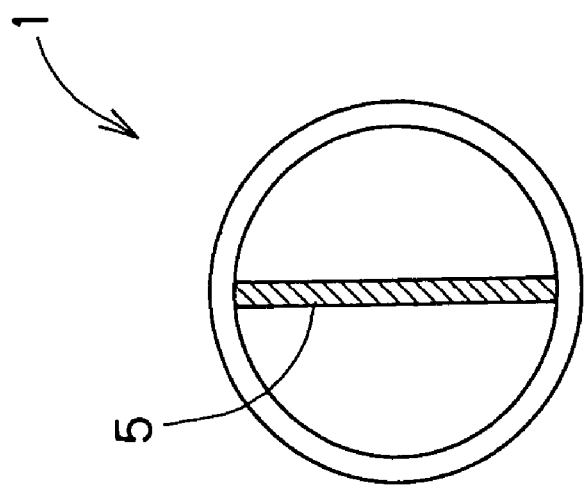
FIG.5(b)
FIG.5(a)

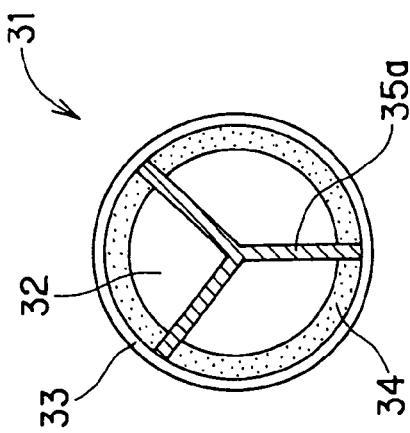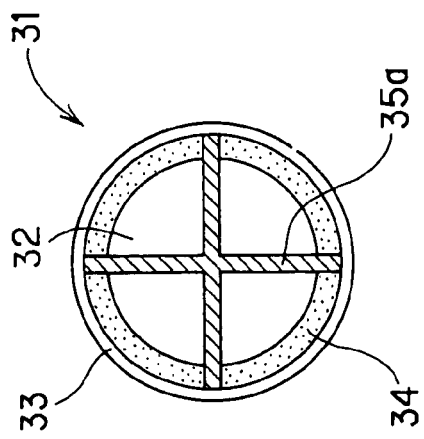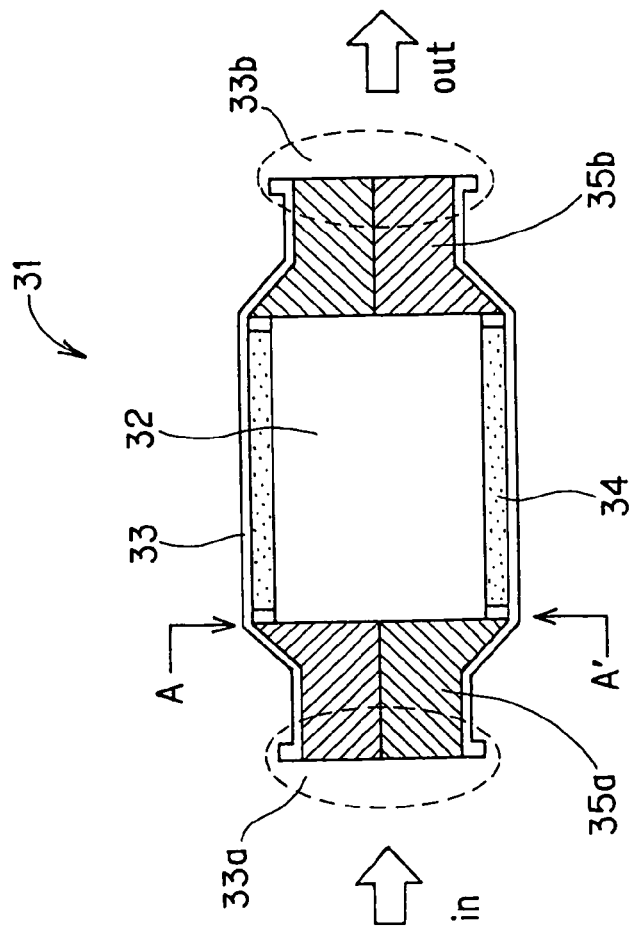

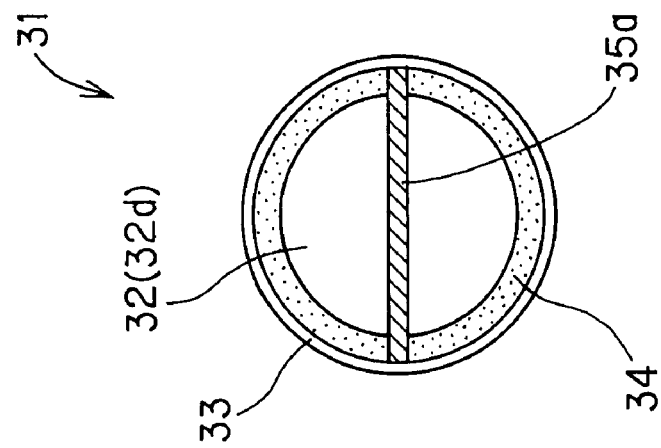
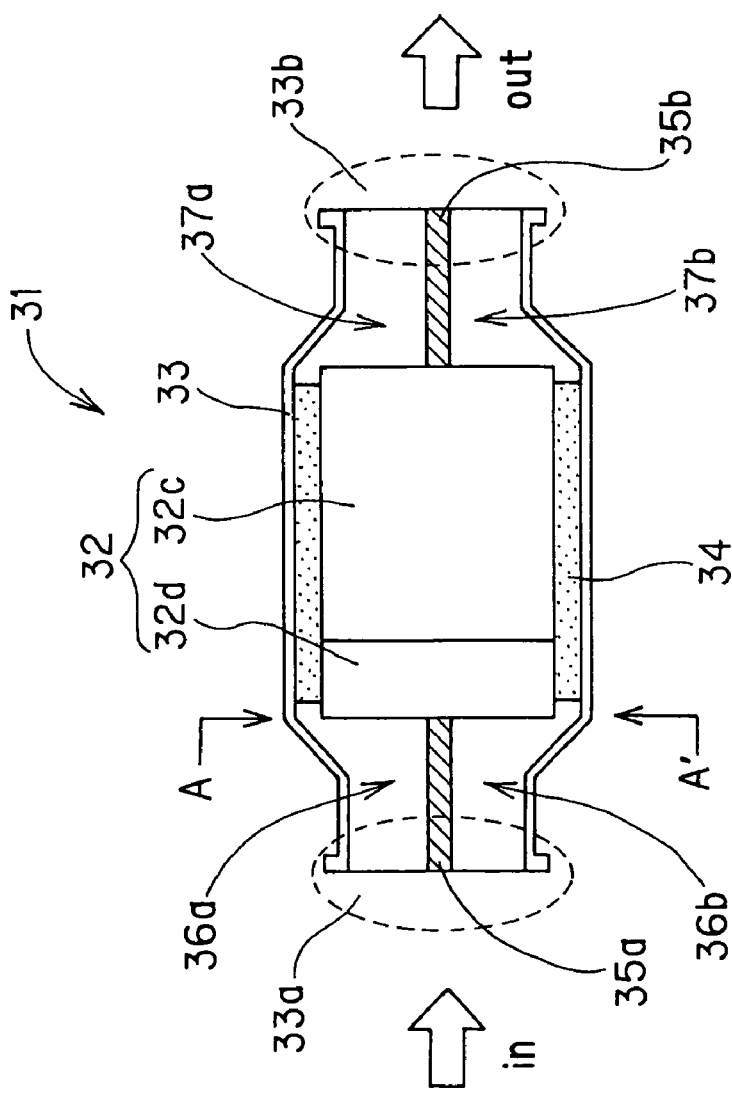
FIG. 13(b)
FIG. 13(a)

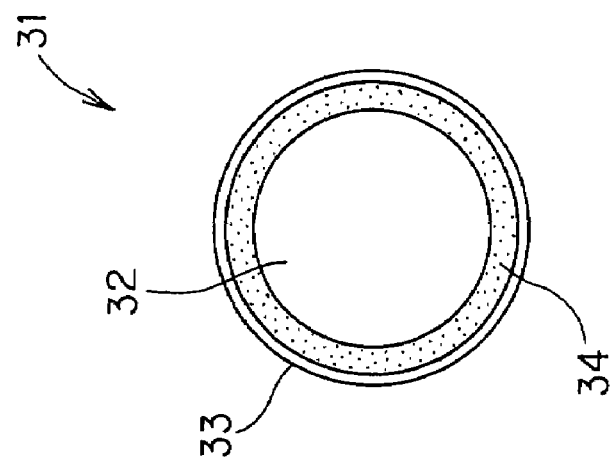
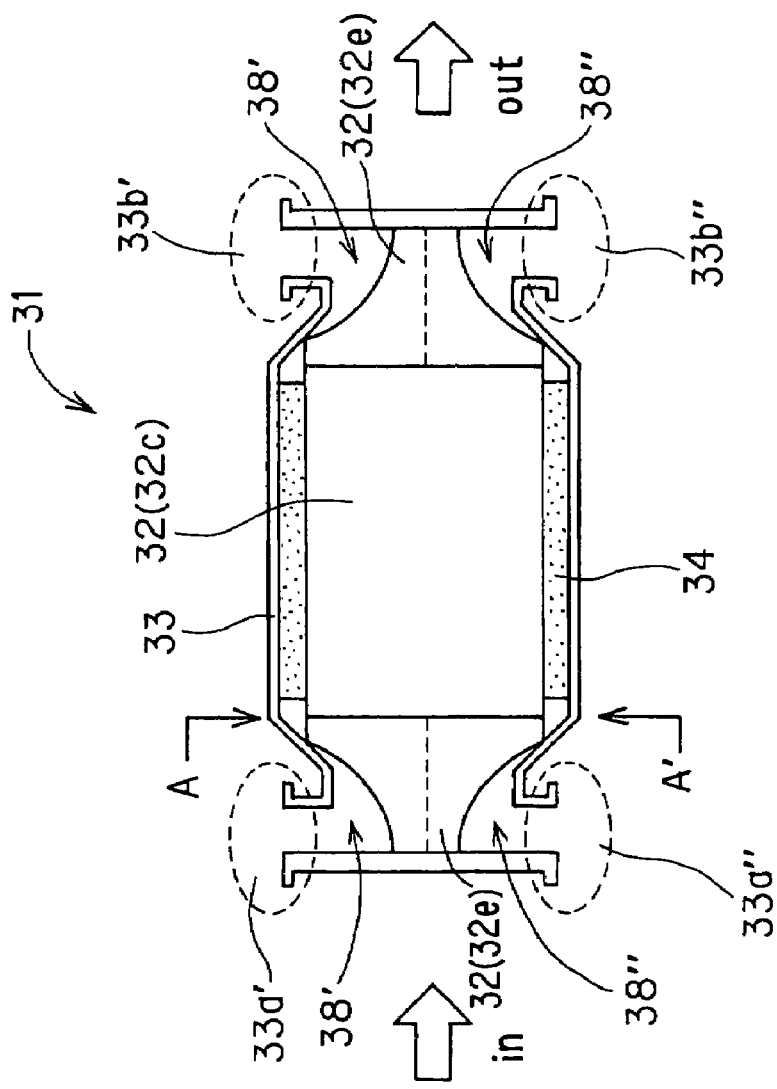
FIG.15(b)
FIG.15(a)

US 7,438,868 B2

HONEYCOMB STRUCTURE AND CATALYTIC CONVERTER

BACKGROUND OF THE INVENTION AND RELATED ART STATEMENT

The present invention relates to a honeycomb structure suitably used as a catalyst carrier in a catalyst body for purifying an exhaust gas emitted from an internal combustion engine such as gasoline engine or the like, as well as to a catalytic converter comprising a honeycomb catalyst body and a housing holding the honeycomb catalyst body.

The exhaust gas emitted from an internal combustion engine such as gasoline engine or the like contains a large amount of harmful components such as nitrogen oxide (NOx), hydrocarbons, carbon monoxide and the like. These harmful components, when per se released into the air, cause environmental pollution; therefore, there is generally mounted, in an exhaust gas passage extending from the internal combustion engine, a catalyst body for purifying the harmful components contained in the exhaust gas.

As the catalyst body used for such a purpose, there can be mentioned, for example, a honeycomb catalyst body comprising a honeycomb structure 1 as a catalyst carrier, such as shown in FIG. 1, in which a large number of cells 3 each functioning as a gas passage are formed by being surrounded by partition walls 4, and an exhaust gas purification catalyst (e.g. a three-way catalyst) carried on the partition walls of the honeycomb structure.

With such a honeycomb catalyst body, the purification of the harmful components contained in an exhaust gas is promoted, whereby the harmful components contained in the exhaust gas can be reduced and the exhaust gas can be purified effectively.

Generally, the above honeycomb catalyst body is used in the form of, for example, a catalytic converter 11 such as shown in FIG. 2, comprising a honeycomb catalyst body 12, a housing which is cylindrical, can hold the honeycomb catalyst body 12, and has an exhaust gas-incoming section 13a at one end and a purified gas-outgoing section 13b at the other end, and a holding material 14 interposed between the outer surface of the honeycomb catalyst body 12 and the inner surface of the housing 13, and is mounted in an exhaust gas passage extending from an internal combustion engine or the like [reference is made to, for example, Patent Literature 1 (U.S. Pat. No. 3,390,698)].

In mounting the above catalytic converter in an exhaust gas passage, it is necessary to minimize the reduction in engine output caused by exhaust gas interference. The reason is that in a multi-cylinder (e.g. four cylinder or six cylinder) engine, when the exhaust gases emitted from the individual cylinders are combined in one passage, there is a difference in timings of exhaust gas discharge from various cylinders (i.e. timings of fuel combustion in the cylinders) and accordingly the high-pressure exhaust gas emitted from one cylinder prevents smooth exhaust gas discharge from other cylinder (this phenomenon is called exhaust gas interference), resulting in a reduction in engine output.

Hence, there has been adopted a structure such as shown in FIG. 3, wherein, first, exhaust pipes 22a and 22c (or 22b and 22d) alone of a multi-cylinder engine 21, extending from cylinders whose combustion orders are not continuous, are combined in one catalytic converter 23a (or 23b), finally, pipes extending from these two catalytic converters 23a and 23b are combined in one passage, and thus the catalytic converter 23a and the catalytic converter 23b are mounted in an exhaust gas passage 24 [reference is made to, for example, Patent Literature 2 (JP-A-2003-138962)].

Such a structure is very effective from a standpoint of preventing the reduction in engine output caused by exhaust gas interference; however, this structure requires at least two sets of honeycomb structures as a catalyst carrier, housings (e.g. metal cases) and holding materials (e.g. ceramic mats), making it difficult to use a catalytic converter of compact structure and, when the engine space is small, there has been a case in which mounting of catalytic converter is impossible. Further, the increase in the number of required parts has invited a complicated exhaust gas structure, an increased weight of vehicle body and an increased cost.

SUMMARY OF THE INVENTION

The present invention has been made in view of the above-mentioned problems of the prior art, and aims at providing a catalytic converter of compact structure which can effectively prevent the reduction in engine output caused by exhaust gas interference, without adoption of complicated exhaust pipe structure, or increase in vehicle body weight, or increase in cost, as well as a honeycomb structure suitably used as a catalyst carrier of a honeycomb catalyst body held in a catalytic converter.

The present inventor made a study in order to achieve the above aims. As a result, the present inventor found that the above aims can be achieved, for example, by dividing, by diaphragms, the exhaust gas-incoming section and purified gas-outgoing section of a housing constituting a catalytic converter, into two or more exhaust gas-incoming passages and two or more purified gas-outgoing passages. This finding has led to the completion of the present invention. Hence, the present invention provides the following honeycomb structure and catalytic converters.

[1] A honeycomb structure in which a large number of cells each functioning as a gas passage are formed by being surrounded by partition walls, wherein the partition walls are constituted by standard partition walls and thick partition walls each having a thickness larger than the thickness of the standard partition walls, the thick partition walls consist of the thickest partition wall and ordinary thick partition walls each having a thickness between the thickness of the thickest partition wall and the thickness of the standard partition walls, the ordinary thick partition walls are provided at the two sides of the thickest partition wall so that their thicknesses become gradually smaller as the ordinary thick partition walls are apart from the thickest partition wall, and the thickest partition wall is provided so as to divide the large number of cells into two or more cell blocks.

[2] A catalytic converter comprising a honeycomb catalyst body comprising a honeycomb structure as a catalyst carrier in which a large number of cells each functioning as a gas passage are formed by being surrounded by partition walls, and an exhaust gas purification catalyst carried on the partition walls of the honeycomb structure, a housing which is cylindrical, can hold the honeycomb catalyst body, and has an exhaust gas-incoming section at one end and a purified gas-outgoing section at the other end, and a holding material interposed between the outer surface of the honeycomb catalyst body and the inner surface of the housing, wherein
the honeycomb catalyst body has, as the catalyst carrier, a honeycomb structure having an inner wall(s) which is (are) provided so as to divide the large number of cells into two or more cell blocks and which has (have) a thickness larger than the thickness of the partition walls, and the exhaust gas-incoming section and purified gas-outgoing section of the housing are divided by diaphragms into two or more exhaust gas-incoming passages and two or more purified gas-outgoing passages and the diaphragms are provided along the inner wall(s) of the honeycomb structure, whereby the two or more cell blocks of the honeycomb structure are allowed to communicate with the corresponding two or more exhaust gas-incoming passages and corresponding two or more purified gas-outgoing passages of the housing.

[3] A catalytic converter comprising
a honeycomb catalyst body comprising a honeycomb structure as a catalyst carrier in which a large number of cells each functioning as a gas passage are formed by being surrounded by partition walls, and an exhaust gas purification catalyst carried on the partition walls of the honeycomb structure, a housing which is cylindrical, can hold the honeycomb catalyst body, and has an exhaust gas-incoming section at one end and a purified gas-outgoing section at the other end, and a holding material interposed between the outer surface of the honeycomb catalyst body and the inner surface of the housing, wherein
the honeycomb catalyst body has, as the catalyst carrier, a honeycomb structure having, at the two ends, plugged areas which are formed so as to plug each two open ends of part of the large number of cells and divide the large number of cells into two or more cell blocks, and the exhaust gas-incoming section and purified gas-outgoing section of the housing are divided by diaphragms into two or more exhaust gas-incoming passages and two or more purified gas-outgoing passages and the diaphragms are provided along the plugged areas of the honeycomb structure, whereby the two or more cell blocks of the honeycomb structure are allowed to communicate with the corresponding two or more exhaust gas-incoming passages and corresponding two or more purified gas-outgoing passages of the housing.

[4] A catalytic converter comprising
a honeycomb catalyst body comprising a honeycomb structure as a catalyst carrier in which a large number of cells each functioning as a gas passage are formed by being surrounded by partition walls, and an exhaust gas purification catalyst carried on the partition walls of the honeycomb structure, a housing which is cylindrical, can hold the honeycomb catalyst body, and has an exhaust gas-incoming section at one end and a purified gas-outgoing section at the other end, and a holding material interposed between the outer surface of the honeycomb catalyst body and the inner surface of the housing, wherein
the honeycomb catalyst body has, as the catalyst carrier, a honeycomb structure which has, as the partition walls, standard partition walls and thick partition walls having a thickness larger than the thickness of the standard partition walls and wherein the thick partition walls are provided so as to divide the large number of cells into two or more cell blocks, and the exhaust gas-incoming section and purified gas-outgoing section of the housing are divided by diaphragms into two or more exhaust gas-incoming passages and two or more purified gas-outgoing passages and the diaphragms are provided along the thick partition walls of the honeycomb structure, whereby the two or more cell blocks of the honeycomb structure are allowed to communicate with the corresponding two or more exhaust gas-incoming passages and corresponding two or more purified gas-outgoing passages of the housing.

[5] A catalytic converter comprising
a honeycomb catalyst body comprising a honeycomb structure as a catalyst carrier in which a large number of cells each functioning as a gas passage are formed by being surrounded by partition walls, and an exhaust gas purification catalyst carried on the partition walls of the honeycomb structure, a housing which is cylindrical, can hold the honeycomb catalyst body, and has an exhaust gas-incoming section at one end and a purified gas-outgoing section at the other end, and a holding material interposed between the outer surface of the honeycomb catalyst body and the inner surface of the housing, wherein
the honeycomb catalyst body has, as the catalyst carrier, a honeycomb structure set forth in claim 1, and the exhaust gas-incoming section and purified gas-outgoing section of the housing are divided by diaphragms into two or more exhaust gas-incoming passages and two or more purified gas-outgoing passages and the diaphragms are provided along the thickest partition wall of the honeycomb structure, whereby the two or more cell blocks of the honeycomb structure are allowed to communicate with the corresponding two or more exhaust gas-incoming passages and corresponding two or more purified gas-outgoing passages of the housing.

[6] A catalytic converter comprising
a honeycomb catalyst body comprising a honeycomb structure as a catalyst carrier in which a large number of cells each functioning as a gas passage are formed by being surrounded by partition walls, and an exhaust gas purification catalyst carried on the partition walls of the honeycomb structure, a housing which is cylindrical, can hold the honeycomb catalyst body, and has an exhaust gas-incoming section at one end and a purified gas-outgoing section at the other end, and a holding material interposed between the outer surface of the honeycomb catalyst body and the inner surface of the housing, wherein
the honeycomb catalyst body is a composite of two or more honeycomb catalyst body segments, and the exhaust gas-incoming section and purified gas-outgoing section of the housing are divided by diaphragms into two or more exhaust gas-incoming passages and two or more purified gas-outgoing passages and the diaphragms are provided along the contacting area(s) of the two or more honeycomb catalyst body segments, whereby the large number of cells of the honeycomb catalyst body segments are allowed to communicate with the two or more exhaust gas-incoming passages and two or more purified gas-outgoing passages of the housing.

[7] A catalytic converter comprising a honeycomb catalyst body comprising a honeycomb structure as a catalyst carrier in which a large number of cells each functioning as a gas passage are formed by being surrounded by partition walls, and an exhaust gas purification catalyst carried on the partition walls of the honeycomb structure, a housing which is cylindrical, can hold the honeycomb catalyst body, and has an exhaust gas-incoming section at one end and a purified gas-outgoing section at the other end, and a holding material interposed between the outer surface of the honeycomb catalyst body and the inner surface of the housing, wherein the honeycomb catalyst body is a laminate of a first honeycomb catalyst body having a partition wall thickness of less than 0.27 mm (10.5 mil) and a second honeycomb catalyst body having a partition wall thickness of 0.27 mm (10.5 mil) or more and is held in the housing so that the second honeycomb catalyst body is arranged at the exhaust gas-incoming section side of the housing, and the exhaust gas-incoming section and purified gas-outgoing section of the housing are divided by diaphragms into two or more exhaust gas-incoming passages and two or more purified gas-outgoing passages and the diaphragms are provided along the partition walls of the second honeycomb catalyst body, whereby the large number of cells of the second honeycomb structure are allowed to communicate with the two or more exhaust gas-incoming passages of the housing.

[8] A catalytic converter comprising a honeycomb catalyst body comprising a honeycomb structure as a catalyst carrier in which a large number of cells each functioning as a gas passage are formed by being surrounded by partition walls, and an exhaust gas purification catalyst carried on the partition walls of the honeycomb structure, a housing which is cylindrical, can hold the honeycomb catalyst body, and has an exhaust gas-incoming section at one end and a purified gas-outgoing section at the other end, and a holding material interposed between the outer surface of the honeycomb catalyst body and the inner surface of the housing, wherein the honeycomb catalyst body is a laminate of a first honeycomb catalyst body having a partition wall thickness of less than 0.27 mm (10.5 mil) and two second honeycomb catalyst bodies having a partition wall thickness of 0.27 mm (10.5 mil) or more, provided at the both sides of the first honeycomb catalyst body, and is held in the housing in such a state that the two second honeycomb catalyst bodies are arranged at the exhaust gas-incoming section side and purified gas-outgoing section side of the housing, and the exhaust gas-incoming section and purified gas-outgoing section of the housing are divided by diaphragms into two or more exhaust gas-incoming passages and two o more purified gas-outgoing passages and the diaphragms are provided along the partition walls of the second honeycomb catalyst bodies, whereby the large number of cells of the second honeycomb structures are allowed to communicate with the two or more exhaust gas-incoming passages and two or more purified gas-outgoing passages of the housing.

[9] A catalytic converter set forth in the above [8], wherein each of the second honeycomb catalyst bodies has a first cutaway communicating with part of the cells and a second cutaway communicating with other cells, the housing has first and second exhaust gas-incoming sections and first and second purified gas-outgoing sections, and the first cutaways of the second honeycomb structures communicate with the first exhaust gas-incoming section and first purified gas-outgoing section of the housing, and the second cutaways of the second honeycomb structures communicate with the second exhaust gas-incoming section and second purified gas-outgoing section of the housing.

[10] A catalytic converter comprising a honeycomb catalyst body comprising a honeycomb structure as a catalyst carrier in which a large number of cells each functioning as a gas passage are formed by being surrounded by partition walls, and an exhaust gas purification catalyst carried on the partition walls of the honeycomb structure, a housing which is cylindrical, can hold the honeycomb catalyst body, and has an exhaust gas-incoming section at one end and a purified gas-outgoing section at the other end, and a holding material interposed between the outer surface of the honeycomb catalyst body and the inner surface of the housing, wherein the exhaust gas-incoming section and purified gas-outgoing section of the housing are divided by diaphragms into two or more exhaust gas-incoming passages and two or more purified gas-outgoing passages and there is interposed a metal- or ceramic-made reticulate material between each diaphragm and the honeycomb catalyst body.

[11] A composite catalytic converter having two or more catalytic converters each comprising a honeycomb catalyst body comprising a honeycomb structure as a catalyst carrier in which a large number of cells each functioning as a gas passage are formed by being surrounded by partition walls, and an exhaust gas purification catalyst carried on the partition walls of the honeycomb structure, a housing which is cylindrical, can hold the honeycomb catalyst body, and has an exhaust gas-incoming section at one end and a purified gas-outgoing section at the other end, and a holding material interposed between the outer surface of the honeycomb catalyst body and the inner surface of the housing, wherein the two or more catalytic converters are integrated into one piece.

The catalytic converter of the present invention is a catalytic converter of compact structure which can effectively prevent the reduction in engine output caused by exhaust gas interference, without adoption of complicated exhaust pipe structure, or increase in vehicle body weight, or increase in cost. The honeycomb structure of the present invention, when used as a catalyst carrier of a honeycomb catalyst body held in the catalytic converter of the present invention, can effec-

BRIEF DESCRIPTION OF THE DRAWINGS

FIG. 4 is a schematic view showing a catalytic converter of the present invention.

FIG. 5 is a schematic view showing a honeycomb structure of the present invention. FIG. 5(a) is a schematic front view and FIG. 5(b) is an enlarged view of FIG. 5(a).

FIG. 6 is a schematic view showing a honeycomb structure of the present invention.

FIG. 7 is a schematic view showing a honeycomb structure of the present invention.

FIG. 8 is a schematic view showing a catalytic converter of the present invention. FIG. 8(a) is a side sectional view, and FIG. 8(b) and FIG. 8(c) are each a A-A' sectional view of FIG. 8(a).

FIG. 9 is a schematic view showing a catalytic converter of the present invention.

FIG. 10 is a schematic view showing a catalytic converter of the present invention.

FIG. 11 is a schematic view showing a catalytic converter of the present invention.

FIG. 12 is a schematic view showing a catalytic converter of the present invention.

FIG. 13 is a schematic view showing a catalytic converter of the present invention. FIG. 13(a) is a side sectional view and FIG. 13(b) is a A-A' sectional view of FIG. 13(a).

FIG. 14 is a schematic view showing a catalytic converter of the present invention.

FIG. 15 is a schematic view showing a catalytic converter of the present invention. FIG. 15(a) is a side sectional view and FIG. 15(b) is a A-A' sectional view of FIG. 15(a).

FIG. 16 is a schematic view showing a catalytic converter of the present invention.

FIG. 17 is a schematic view showing a composite catalytic converter of the present invention.

In these figures, the numerals refer to the followings. 1: honeycomb structure; 3: cell; 4: partition wall; 5: internal wall; 6: plugged area; 7: thick partition wall; 7a: thickest partition wall; 7b: ordinary thick partition wall; 8: standard partition wall; 11: catalytic converter; 12: honeycomb catalyst body; 13a: exhaust gas-incoming section; 13b: purified gas-outgoing section; 13: housing; 14: holding material; 21: multi-cylinder engine; 22a, 22b, 22c and 22d: exhaust pipes; 23a and 23b: catalytic converters; 24: exhaust gas passage; 31 and 31': catalytic converters; 32 and 32': honeycomb catalyst bodies; 32a and 32b: honeycomb catalyst body segments; 32c: first honeycomb catalyst body; 32d and 32e: second honeycomb catalyst bodies; 33 and 33': housings; 33a: exhaust gas-incoming section; 33a': first exhaust gas-incoming section; 33a'': second exhaust gas-incoming section; 33b: purified gas-outgoing section; 33b': first purified gas-outgoing section; 33b'': second purified gas-outgoing section; 34 and 34': holding materials; 35a and 35b: diaphragms; 36, 36a and 36b: exhaust gas-incoming passages; 37, 37', 37a and 37b: purified gas-outgoing passages; 38': first cutaway; 38'': second cutaway; 41: composite catalytic converter

DETAILED DESCRIPTION OF PREFERRED EMBODIMENT

Description is made below specifically on the best mode for materializing the honeycomb structure and catalytic converter of the present invention. However, the present invention is in no way restricted to the following mode.

Figure 4B:
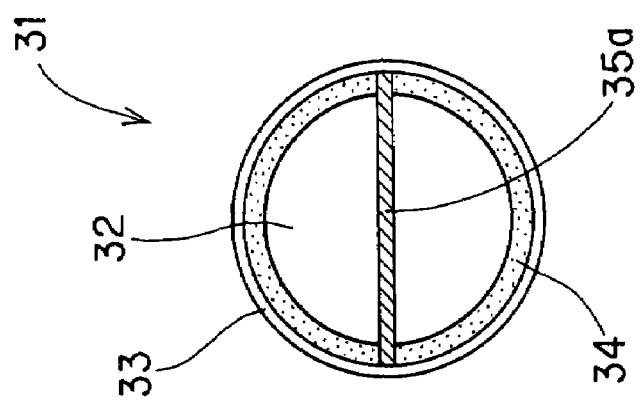
FIG. 4(a) is a side sectional view and FIG. 4(b) is a A-A' sectional view of FIG. 4(a).
Figure 4A:
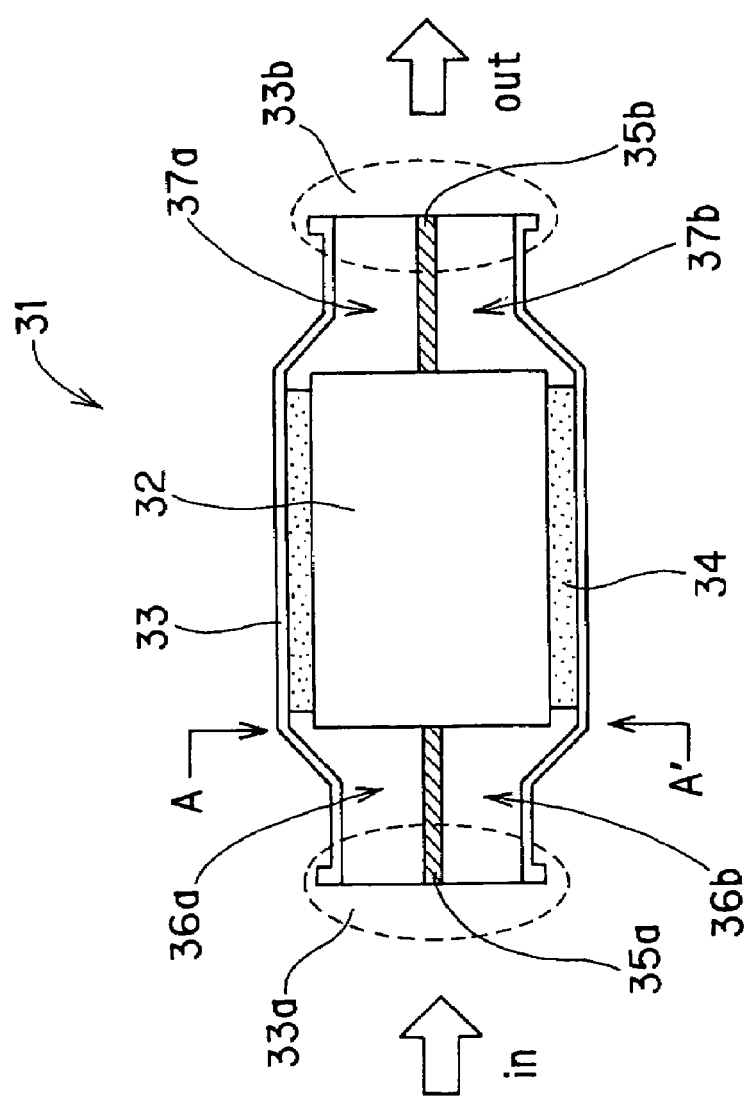

In the catalytic converter of the present invention, as in, for example, a catalytic converter 31 shown in FIG. 4(a) and FIG. 4(b), the exhaust gas-incoming section 33a and purified gas-outgoing section 33b of a housing 33 are divided by diaphragms 35a and 35b into at least two exhaust gas-incoming passages 36a and 36b and at least two purified gas-outgoing passages 37a and 37b. In such a catalytic converter, since at lest two independent exhaust gas passages are formed by the diaphragms provided inside the catalytic converter, it is not necessary to install a plurality of catalytic converters and it is possible to effectively prevent the reduction in engine output caused by exhaust gas interference, with a compact converter construction. It is also possible to avoid the adoption of complicated exhaust gas pipe structure, the increase in vehicle body weight and the increase in cost.

In the catalytic converter of the present invention, in order to reliably form independent exhaust gas passages, the edge portion of each diaphragm is, in many cases, contacted with the end face of the honeycomb catalyst body of the converter. However, with such contact alone, erosion (scraping) may generate at the contacting areas between each diaphragm and the honeycomb catalyst body, owing to the vibration of the diaphragm caused by high-pressure exhaust gas and the difference in thermal expansion coefficient between the diaphragm (ordinarily made of a metal) and the honeycomb structure (ordinarily made of a ceramic) constituting the honeycomb catalyst body. In the catalytic converter of the present invention, it has been made possible to avoid even such a problem (generation of erosion).

The catalytic converter of the present invention comprises, as main constituent elements, a honeycomb catalyst body, a housing and a holding material. Each of these constituent elements is described below.

(1) Honeycomb Catalyst Body

The honeycomb catalyst body which is one constituent element of the present catalytic converter, comprises a honeycomb structure functioning as a catalyst carrier and an exhaust gas purification catalyst carried on the partition walls of the honeycomb structure.

In the present specification, the "exhaust gas purification catalyst" means a catalyst component having an effect for exhaust gas purification and includes all catalysts for promoting the purification of the harmful components contained in an exhaust gas, such as nitrogen oxides, hydrocarbons, carbon monoxide and the like. It includes, for example, oxidation catalysts for oxidizing nitrogen oxides; three way catalysts for simultaneously conducting oxidation of nitrogen oxides and reduction of hydrocarbons and carbon monoxide; and occlusion catalysts for nitrogen oxides (NOx).

Specifically, there are suitably used, as the oxidation catalysts, noble metals such as Pt, Pd, Rh and the like; as the three way catalysts, a mixture of Pt and Rh and a mixture of Pd and Rh; and as the occlusion catalysts for nitrogen oxides (NOx), alkali metals (e.g. Li, Na, K and Cs) and alkaline earth metals (e.g. Ca, Ba and Sr).

Incidentally, in the present invention, the honeycomb catalyst body may carry, in addition to the above-mentioned exhaust gas purification catalysts, for example, co-catalysts represented by oxides of Ce and Zr and hydrocarbon (HC) adsorbents.

As to the method for carrying the exhaust gas purification catalyst, there is no particular restriction. As the method, there can be mentioned, for example, a method of wash-coating a catalyst solution containing a catalyst component, on the partition walls of a honeycomb structure and then applying a heat treatment at a high temperature for baking. Catalyst components such as three way catalyst, oxidation catalyst, occlusion catalyst for nitrogen oxides and the like are carried in a highly dispersed state; therefore, it is preferred that such catalyst components are beforehand carried on a heat-resistant inorganic oxide of high specific surface area, such as alumina and then the resulting material is carried on the partition walls or the like of a honeycomb structure.

Figure 1:
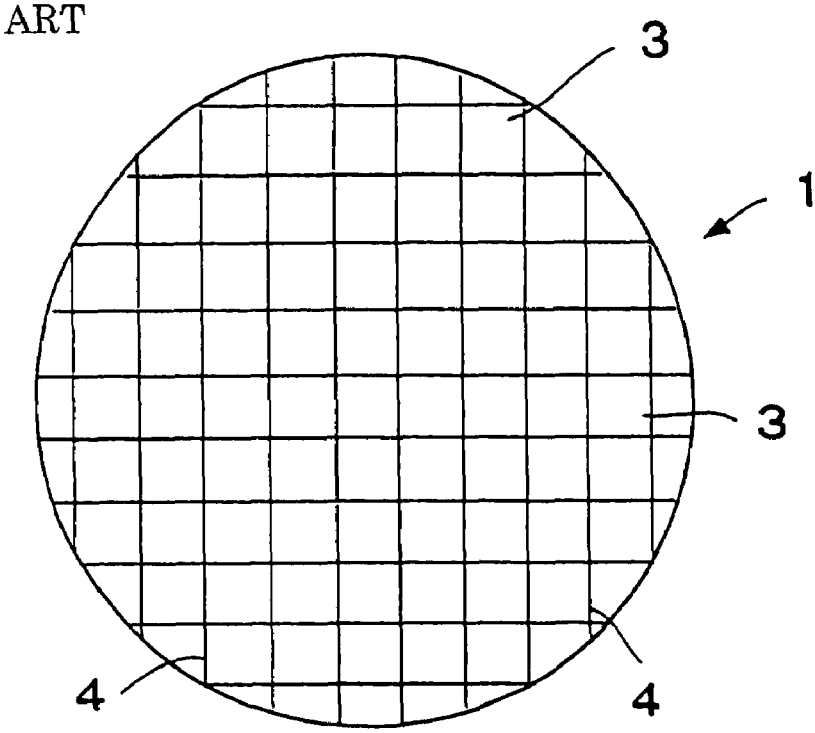
FIG. 1 is a schematic view showing a honeycomb structure.
Figure 2:
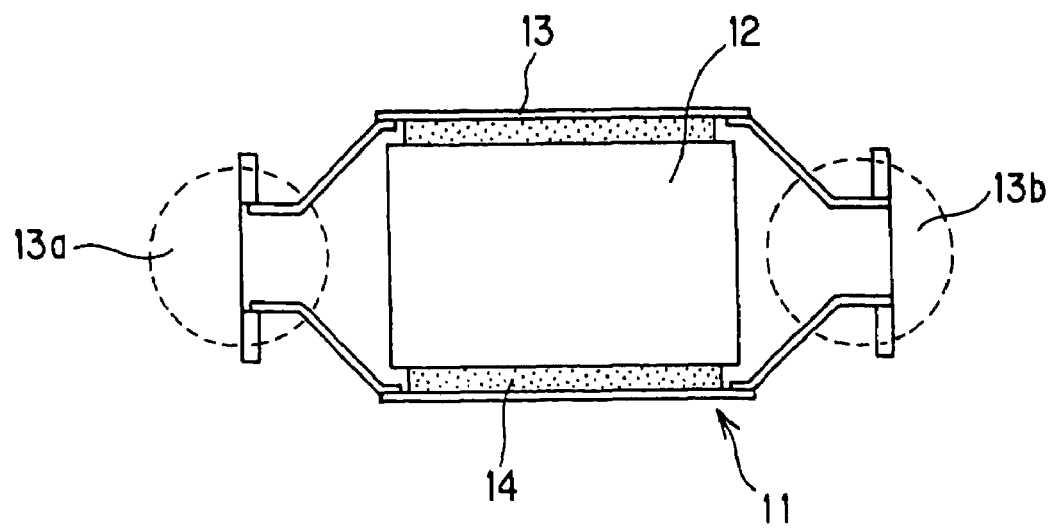
FIG. 2 is a schematic view showing a conventional catalytic converter.
Figure 3:
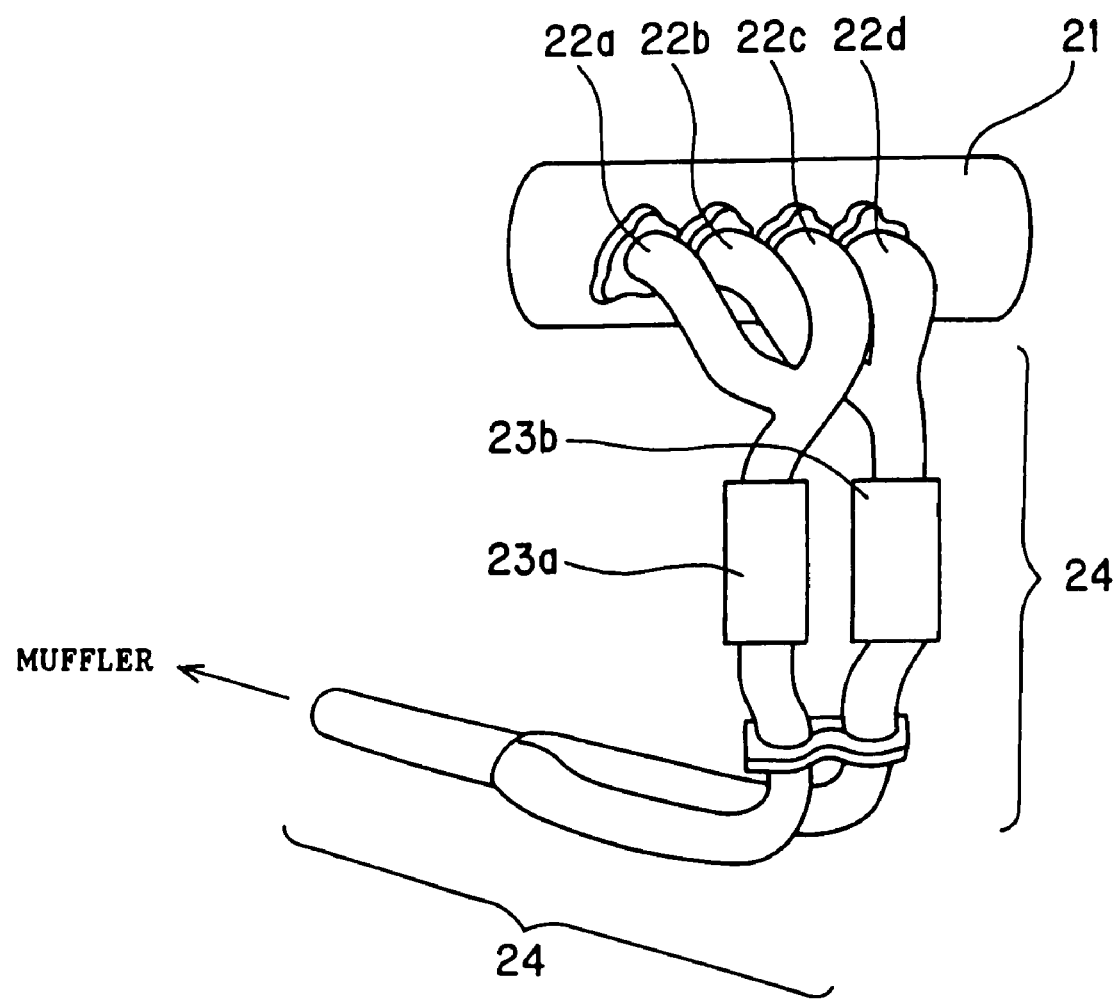
FIG. 3 is a schematic perspective view showing a state in which a catalytic converter is mounted.

As the honeycomb structure which functions as a catalyst carrier for the above-mentioned exhaust gas purification catalyst, there is used, for example, a honeycomb structure 1 shown in FIG. 1, wherein a large number of cells 3 each functioning as a gas passage are formed by being surrounded by partition walls 4.

As to the end face shape of the honeycomb structure, there is no particular restriction. There can be mentioned, for example, a circle such as shown in FIG. 1, an eclipse, a triangle, a tetragon (including a trapezoid) and a hexagon. There is no particular restriction, either, as to the cell shape of the honeycomb structure (the cell shape in a section normal to the direction of cell formation). There can be mentioned, for example, a tetragon such as shown in FIG. 1, a hexagon and a triangle.

There is no particular restriction, either, as to the cell density of the honeycomb structure. However, the cell density is preferably in a range of 6 to 1,500 cells/in.$^2$ (0.9 to 233 cells/cm$^2$). The thickness of the partition walls is preferably in a range of 20 to 2,000 μm.

There is no particular restriction as to the material for the honeycomb structure. However, a ceramic can be used preferably and, from the standpoint of strength, heat resistance, corrosion resistance, etc., the ceramic is preferred to be any of cordierite ($2MgO.2Al_2O_3.5SiO_2$), alumina ($Al_2O_3$), mullite ($3Al_2O_3.2SiO_2$), silicon nitride ($Si_3N_4$), silicon carbide (SiC), aluminum titanate ($Al_2TiO_5$), zirconia ($ZrO_2$) and metallic silicon-silicon carbide (Si—SiC) composite material. The material for the honeycomb structure may also be a metal such as Fe—Cr—Al type alloy or the like.

The above honeycomb structure, when made of a ceramic, can be obtained, for example, by mixing and kneading aggregate particles (made of a ceramic), water, optionally an organic binder (e.g. hydroxypropymethyl cellulose or methyl cellulose), a pore former (e.g. graphite, starch or a synthetic resin), a surfactant (e.g. ethylene glycol or a fatty acid soap), etc. to prepare a puddle, extruding the puddle using a die having slits having a shape corresponding to the to-be-formed partition walls giving a desired cell shape, a desired partition wall thickness and a desired cell density, drying the resulting extrudate to obtain a shaped material, and firing the shaped material.

The honeycomb structure, when made of a metal, can be obtained, for example, by winding a metal-made corrugated foil or by conducting extrusion in the same manner as in the above case of using a ceramic material.

The honeycomb structure functioning as a catalyst carrier has a basic constitution such as mentioned above. In the catalytic converter of the present invention, however, since there are provided diaphragms for dividing the exhaust gas-incoming section and purified gas-outgoing section of the housing into two or more exhaust gas-incoming passages and two or more purified gas-outgoing passages, it is necessary to prevent the erosion (scraping) which generates at the areas of honeycomb structure contacting with each diaphragm.

This erosion, as mentioned previously, is caused, for example, by the vibration of the diaphragm brought about by incoming high-pressure exhaust gas and the difference in thermal expansion coefficient between the diaphragms and the honeycomb structure. In recent years, the heat capacity of partition walls of honeycomb structure, specifically the thickness of partition walls has been reduced at a rapid pace in order to activate the catalyst carried on the honeycomb structure, at an early timing after the start of engine and thereby increase the purification ability of the catalyst; this allows the erosion to take place easily. Thus, the reduction in thickness of partition walls has allowed the honeycomb structure to have lower mechanical strengths than prior levels and accordingly a fragile construction.

Hence, in the catalytic converter of the present invention, it is preferred to use, as the catalyst carrier, a honeycomb structure whose contacting areas with diaphragms of housing have been strengthened beforehand.

Figure 6B:
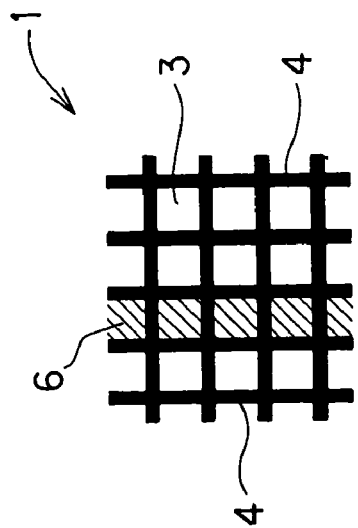
FIG. 6(b) and FIG. 6(c) are each an enlarged view of FIG. 6(a).
Figure 6C:
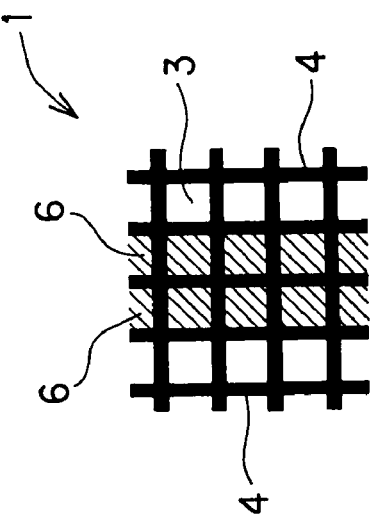
Figure 6A:
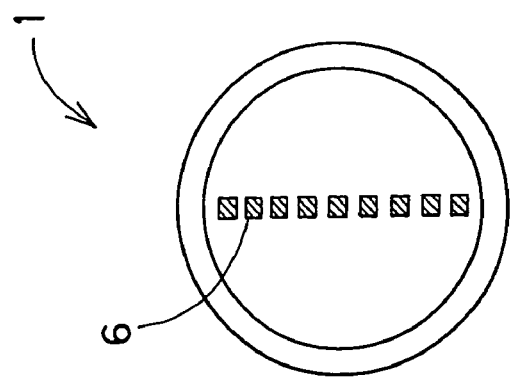
FIG. 6(a) is a schematic front view.
Figure 7C:
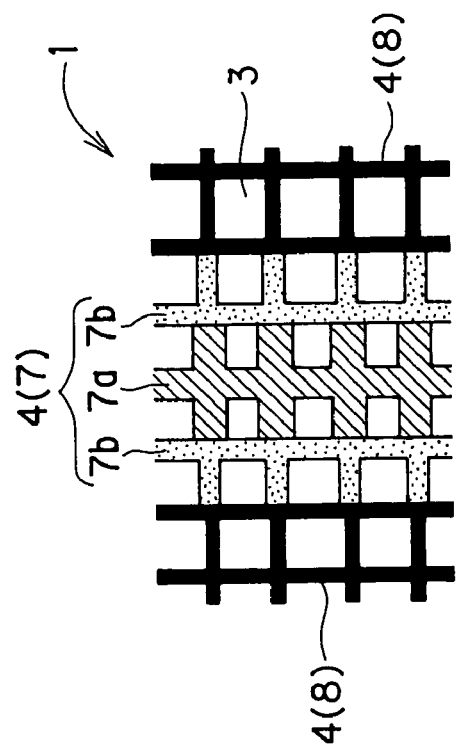
FIG. 7(b) and FIG. 7(c) are each an enlarged view of FIG. 7(a).
Figure 7B:
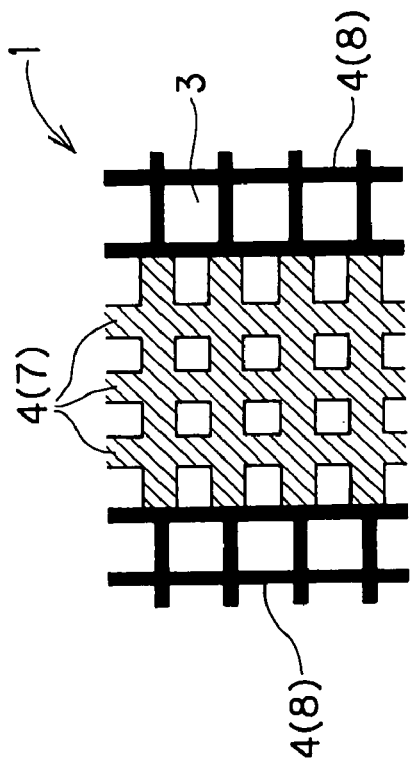
Figure 7A:
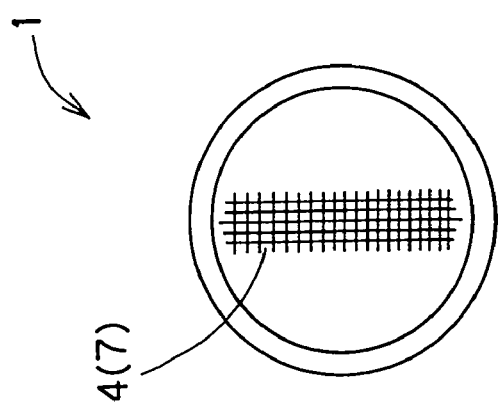
FIG. 7(a) is a schematic front view.

Specifically, there can be suitably used, for example, a honeycomb structure such as a honeycomb structure 1 shown in FIG. 5(a) and FIG. 5(b), which has an internal wall 5 having a thickness larger than the thickness of partition walls 4 at the contacting areas with diaphragms of housing; a honeycomb structure such as a honeycomb structure 1 shown in FIG. 6(a) to FIG. 6(c), which has, at the above-mentioned contacting areas, plugged areas 6 blocking the open ends of part of cells 3 at the both end faces of the honeycomb structure; and a honeycomb structure such as a honeycomb structure 1 shown in FIG. 7(a) to FIG. 7(c), which has, at the above-mentioned contacting areas, thick partition walls 7 having a thickness(es) larger than the thickness of standard partition walls 8 (these walls are usual partition walls used only for filtration).

In these honeycomb structures, the internal wall, plugged areas or thick partition walls, as compared with other portions (the portions constituted by standard partition walls), have high mechanical strengths and are strong. Therefore, in the catalytic converter of the present invention, by providing diaphragms along the internal wall, plugged areas or thick partition walls of the honeycomb structure, it is possible to effectively prevent the erosion (scraping) which generates at the areas of the honeycomb structure contacting with the diaphragms.

In the honeycomb structure 1 shown in FIG. 5(a) and FIG. 5(b), the large number of cells 3 are divided into left and right two cell blocks by an internal wall 5. Each of these left and right two cell blocks, together with the diaphragms of the housing, form individual exhaust gas passages. As to the thickness of the internal wall, there is no particular restriction; however, the thickness of the internal wall is preferably 5 times or more the ordinary partition wall thickness from the standpoint of securing a sufficient strength. Incidentally, the internal wall may be formed in any direction as long as it divides the large number of cells into two or more cell blocks, and the internal wall need not be formed in the direction of partition wall formation. For example, three internal walls each having a central angle of 120° may be formed as in a honeycomb structure 1 shown in FIG. 1 wherein partition walls 4 intersecting with each other at right angles are formed in a lattice shape and a large number of cells 3 are divided into three cell blocks.

There is no particular restriction, either, as to the method for formation of internal wall. The internal wall can be formed, for example, by, in extruding a ceramic puddle using a die having slits having a shape corresponding to the to-be-formed partition walls giving a desired cell shape, a desired partition wall thickness and a desired cell density, widening the width of the die slits corresponding to the internal wall to be formed. The internal wall may also be formed, for example, by dividing a honeycomb structure into a plurality of honeycomb structure segments, coating the surfaces of these segments to be bonded with each other, with a ceramic coating material (a slurry containing a powder of a sintered ceramic material), rebonding the segments, and drying and firing the rebonded segments.

In the honeycomb structure shown in FIG. 6(*a*) to FIG. 6(*c*), a large number of cells 3 are divided into left and right two cell blocks by forming a large number of plugged areas 6 in a straight line. Each of these left and right two cell blocks, together with the diaphragms of a housing, form individual exhaust gas passages. The plugged areas may plug only the open ends of those cells to be plugged, or may plug the whole portions of those cells to be plugged.

The honeycomb structure 1 of FIG. 6(*b*) is a case in which a large number of plugged areas 6 have been formed in a straight line for one cell row, and the honeycomb structure 1 of FIG. 6(*c*) is a case in which a large number of plugged areas 6 have been formed in a straight line for two cell rows. There is no particular restriction as to the number of cell rows for which plugged areas are to be formed. However, it is preferred to form a large number of plugged areas 6 in a straight line for one to five cell rows, from the standpoint of securing a sufficient strength.

There is no particular restriction, either, as to the method for formation of plugged areas. There can be mentioned, for example, a method of attaching a pressure-sensitive adhesive sheet to one end face of a honeycomb structure, making holes only at the portions of the sheet corresponding to the cells to be plugged, to prepare a mask, immersing the end face of the honeycomb structure to which the mask has been attached, in a ceramic slurry to fill the to-be-plugged cells with the ceramic slurry and form plugged areas, conducting the same steps as above, for other end face of the honeycomb structure, and drying and firing the plugged areas.

In the honeycomb structure 1 shown in FIG. 7(*a*) to FIG. 7(*c*), a large number of cells 3 are divided by thick partition walls 7 into left and right two cell blocks. Each of these left and right two cell blocks, together with the diaphragms of a housing, form individual exhaust gas passages.

The honeycomb structure 1 of FIG. 7(*b*) is a case in which three thick partition walls 7 equal in thickness are provided. However, the manner in which thick partition walls 7 are provided, is not restricted particularly as long as their thicknesses are larger than the thickness of standard partition walls 8.

For example, in the honeycomb structure 1 shown in FIG. 7(*c*), partition walls 4 are constituted by standard partition walls 8 and thick partition walls 7 each having a thickness larger than the thickness of the standard partition walls 8; the thick partition walls 7 consist of the thickest partition wall 7*a* and ordinary thick partition walls 7*b* each having a thickness between the thickness of the thickest partition wall 7*a* and the thickness of the standard partition walls 8; the ordinary thick partition walls 7*b* are provided at the two sides of the thickest partition wall 7*a* so that their thicknesses become gradually smaller as the ordinary thick partition walls 7*b* are apart from the thickest partition wall 7*a*; and the thickest partition wall 7*a* is provided so as to divide a large number of cells 3 into two or more cell blocks. More specifically explaining, the thickest partition wall 7*a* is provided so that it is on a straight line passing the center of each end face of the honeycomb structure 1 and extending to the periphery of each end face and divides the large number of cells 3 into left and right two even cell blocks, and there are provided, at the both sides of the thickest partition wall 7*a*, the ordinary thick partition walls 7*b* having a thickness smaller than the thickness of the thickest partition walls 7*a*.

In a honeycomb structure such as the honeycomb structure 1 shown in FIG. 7(*b*), wherein a plurality of thick partition walls 7 equal in thickness are provided, the mechanical strength (isostatic strength) at the border between thick partition walls 7 and standard partition walls 8 tend to be low; moreover, a thermal stress tends to act on this border and, when the honeycomb structure is heated and cooled owing to the increase and decrease of exhaust gas temperature, there is a fear of crack generation at the border.

Meanwhile, in a honeycomb structure such as the honeycomb structure 1 shown in FIG. 7(*c*), the thicknesses of partition walls are changed gradually and this can effectively prevent the decrease of the mechanical strength (isostatic strength) at the border between thick partition walls 7 and standard partition walls 8, as well as the crack generation caused by the action of thermal stress.

In order to prevent the decrease of the mechanical strength (isostatic strength) at the border between thick partition walls 7 and standard partition walls 8, as well as the crack generation caused by the action of thermal stress, there is also considered a honeycomb structure in which the proportion of thick partition walls in whole partition walls has been increased. Such a honeycomb structure, however, is not preferred because it reduces the open areas of the cells constituting gas passages and invites an increase in pressure loss when a gas passes.

There is no particular restriction, either, as to the method for formation of thick partition walls. They can be formed, for example, by, in extruding a ceramic puddle using a die having slits having a shape corresponding to the to-be-formed partition walls giving a desired cell shape, a desired partition wall thickness and a desired cell density, widening the widths of the die slits corresponding to the thick partition walls.

In the above there have been described honeycomb structures wherein the large number of cells are divided into left and right two cell blocks by an internal wall, plugged areas or thick partition walls. However, the honeycomb structure usable in the catalytic converter of the present invention is not restricted to the above honeycomb structures as long as two or more independent exhaust gas passages can be formed therein. The honeycomb structure usable in the catalytic converter of the present invention may be, for example, one wherein the large number of cells are divided into three or more cell blocks. In such a honeycomb structure, exhaust gas passages corresponding to the individual cylinders of multi-cylinder engine can be formed, whereby the reduction in engine output caused by exhaust gas interference can be prevented more effectively.

The division into cell blocks need not be done only by a straight line, as shown in FIG. 5(a), FIG. 6(a) and FIG. 7(a). In a honeycomb structure having end faces of, for example, circular shape, it is possible to form an internal wall, plugged areas or thick partition walls on an inner circle which is concentric to the outer peripheral circle, to divide the large number of cells into cells inside the inner circle and cells outside the inner circle. The division into cell blocks need not be even and may be uneven.

(2) Housing

The housing as a constituent element of the catalytic converter of the present invention is, for example, a housing 33 shown in FIG. 4(a) and FIG. 4(b), which has a cylindrical shape capable of holding therein a honeycomb catalyst body 32 and has an exhaust gas-incoming section 33a at one end and a purified gas-outgoing section 33b at other end and wherein the exhaust gas-incoming section 33a and the purified gas-outgoing section 33b are divided by diaphragms 35a and 35b into at least two exhaust gas-incoming passages 36a and 36b and at least two purified gas-outgoing passages 37a and 37b, respectively, and the diaphragms 35a and 35b are provided along the internal wall, plugged areas or thick partition walls of the honeycomb catalyst body 32.

As to the total shape of the housing, there is no particular restriction as long as the housing is a cylindrical shape capable of holding therein a honeycomb catalyst body and has an exhaust gas-incoming section at one end and a purified gas-outgoing section at other end. The total shape of the housing can be appropriately selected depending upon the shape of the honeycomb catalyst body, etc. When there is used, for example, a cylindrical honeycomb catalyst body 32 such as shown in FIGS. 4(a) and 4(b), the housing 33 can also be approximately cylindrical.

As the diaphragms, there is ordinarily used a plate of about 0.5 to 10 mm in thickness. There is no particular restriction as to the shape of the plate as long as it can divide the exhaust gas-incoming section and the purified gas-outgoing section into a plurality of exhaust gas-incoming passages and a plurality of purified gas-outgoing passages, respectively. There can be mentioned, for example, diaphragms 35a and 35b of a housing 33 shown in FIG. 4(a) and FIG. 4(b), which divide the exhaust gas-incoming section 33a and purified gas-outgoing section 33b of the housing 33 into upper and lower two even exhaust gas-incoming passages 36a and 36b and upper and lower two even purified gas-outgoing passages 37a and 37b, respectively.

The diaphragms may also be diaphragms 35a and 35b of a housing 33 shown in FIG. 8(a) to FIG. 8(c), which divide the exhaust gas-incoming section 33a and purified gas-outgoing section 33b of the housing 33 into three or four even exhaust gas-incoming passages and three or four even purified gas-outgoing passages, respectively. This form is preferred because it allows formation of exhaust gas passages corresponding to the individual cylinders of a multi-cylinder engine and can more effectively prevent the reduction in engine output caused by exhaust gas interference.

Figure 9B:
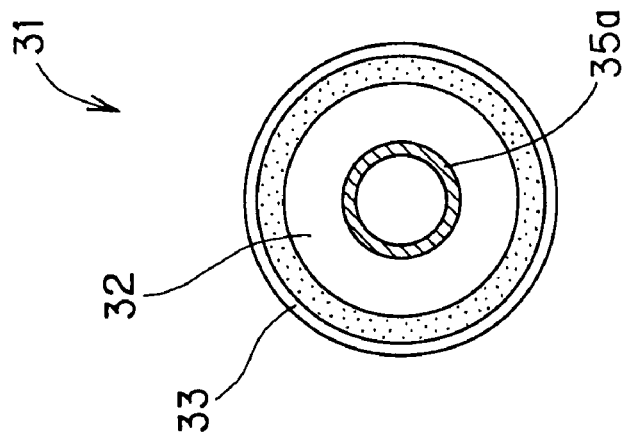
FIG. 9(a) is a side sectional view and FIG. 9(b) is a A-A' sectional view of FIG. 9(a).
Figure 9A:
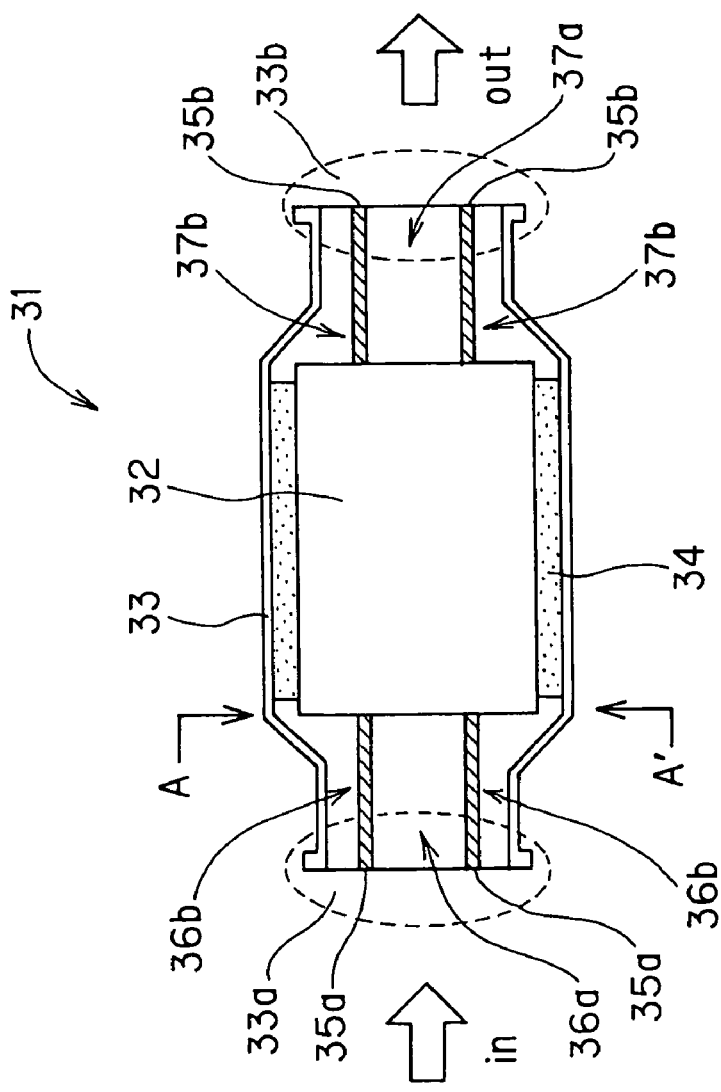

The diaphragms may also be diaphragms 35a and 35b of a housing 33 shown in FIG. 9(a) and FIG. 9(b), which are each formed in a cylindrical shape concentric to the outer peripheral circle of a honeycomb structure held in the housing 33 and divide the exhaust gas-incoming section 33a and purified gas-outgoing section 33b of the housing 33 into inner and outer two exhaust gas-incoming passages 36a and 36b and inner and outer two purified gas-outgoing passages 37a and 37b, respectively.

Figure 10B:
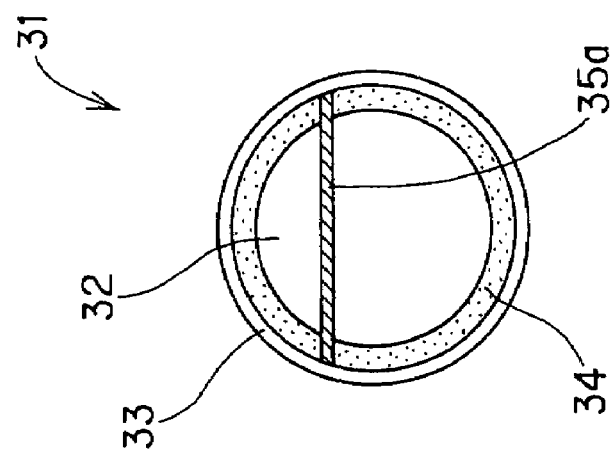
FIG. 10(a) is a side sectional view and FIG. 10(b) is a A-A' sectional view of FIG. 10(a).
Figure 10A:
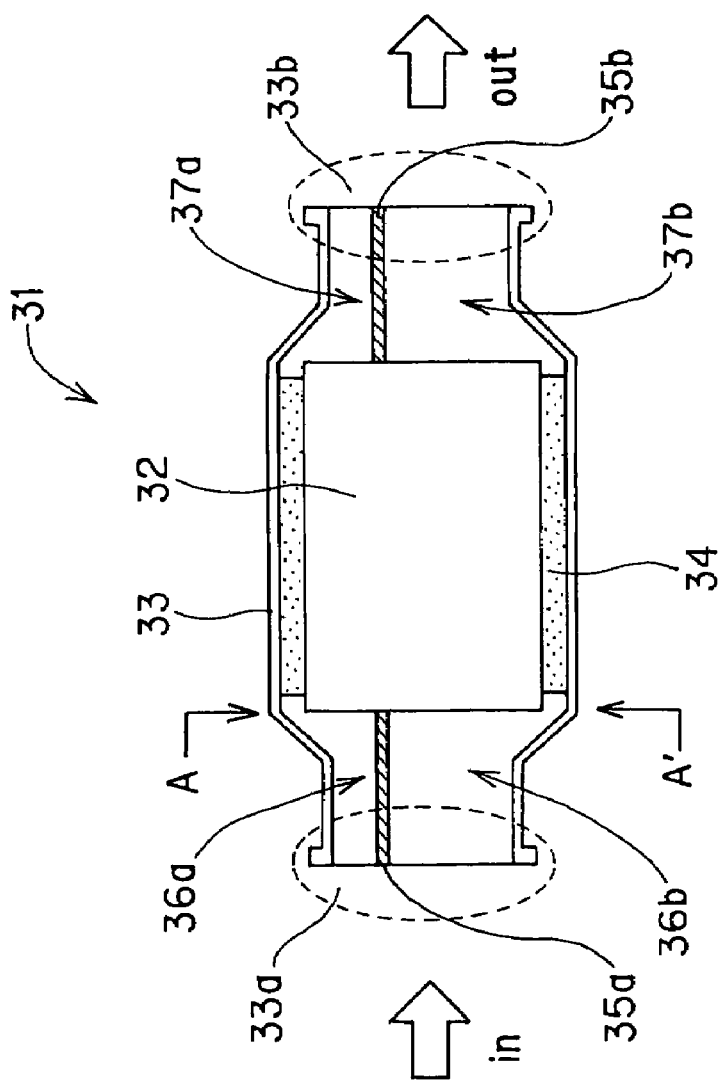
Figure 11B:
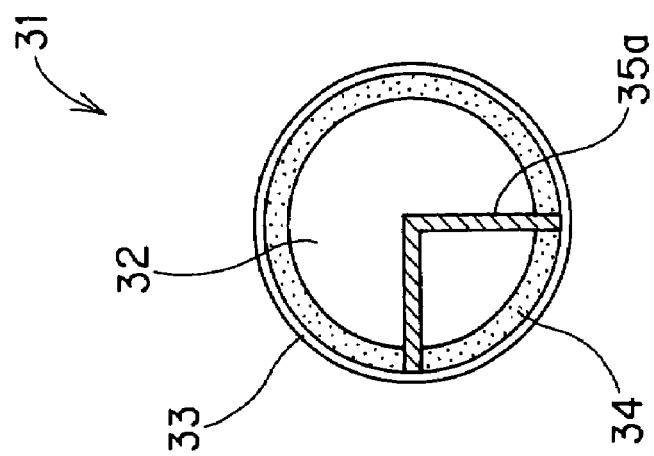
FIG. 11(a) is a side sectional view and FIG. 11(b) is a A-A' sectional view of FIG. 11(a).
Figure 11A:
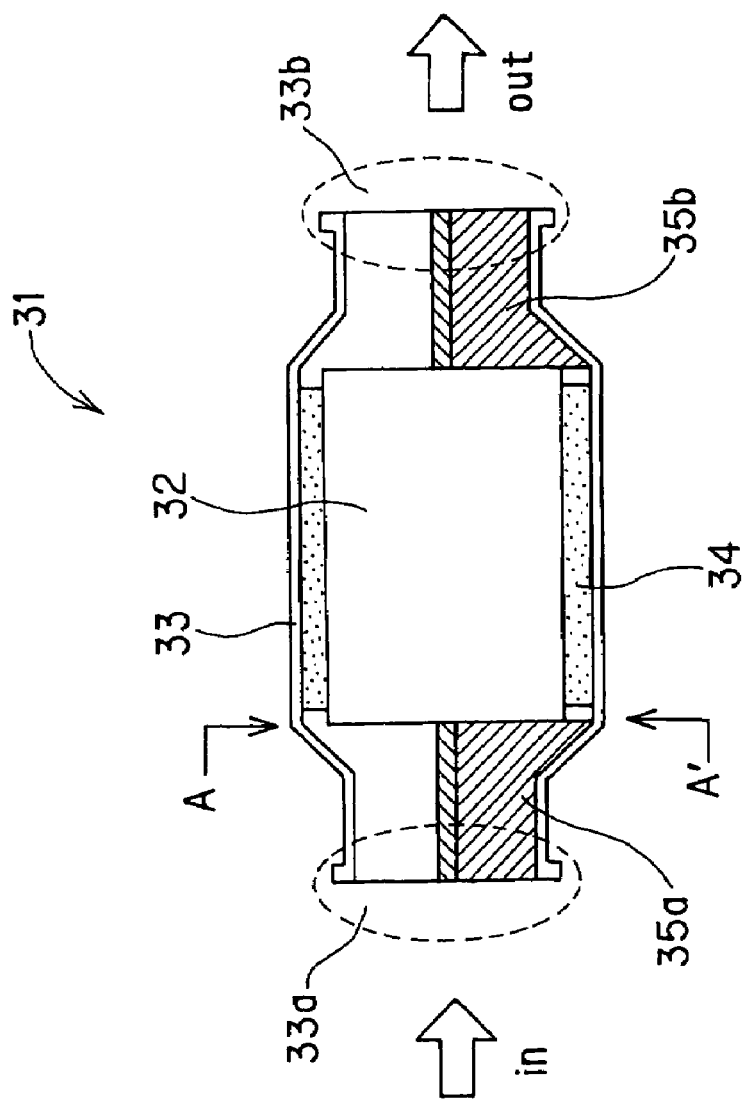

Further, the diaphragms need not divide the exhaust gas-incoming section and purified gas-outgoing section of housing into even exhaust gas-incoming passages and even purified gas-outgoing passages, respectively, and may divide them into uneven passages. As such diaphragms, there can be mentioned, for example, diaphragms 35a and 35b of a housing 33 shown in FIG. 10(a) and FIG. 10(b), which divide the exhaust gas-incoming section 33a and purified gas-outgoing section 33b of the housing 33 into upper two uneven exhaust gas-incoming passages 36a and 36b and upper and lower uneven purified gas-outgoing passages 37a and 37b, respectively; or diaphragms 35a and 35b of a housing 33 shown in FIG. 11(a) and FIG. 11(b), which divide the exhaust gas-incoming section 33a and purified gas-outgoing section 33b of the housing 33 into two uneven exhaust gas-incoming passages 36a and 36b whose sections are fan-shaped but have different central angles and two uneven purified gas-outgoing passages 37a and 37b whose sections are fan-shaped but have different central angles, respectively.

Diaphragms of various shapes such as shown above can be used in the catalytic converter of the present invention. Irrespective of the shape of diaphragm, diaphragms, specifically their edge portions need be provided along the internal wall, plugged areas or thick partition walls of the honeycomb catalyst body.

As to the material for the housing (including the main body and the diaphragms), there is no particular restriction. However, a metal, particularly a stainless steel (e.g. SUS 409) superior in mechanical strengths and corrosion resistance can be suitably used.

(3) Holding Material

The holding material as a constituent element of the catalytic converter of the present invention, as in the case of, for example, a holding material 34 shown in FIG. 4(a) and FIG. 4(b), is interposed between the outer surface of a honeycomb catalyst body 32 and the inner surface of a housing 33. This holding material 34 holds and fixes the honeycomb catalyst body 32 inside the housing 33.

As to the material for the holding material, there is no particular restriction. However, the material is preferably a non-intumescent ceramic fiber mat because such a mat generates no excessive pressure to the honeycomb catalyst body during the use of the catalytic converter (i.e. at high temperatures) and can prevent the breakage of the honeycomb catalyst body. Specifically, there can be suitably used, for example, a mat made of a ceramic (e.g. alumina, mullite, silicon carbide, silicon nitride or zirconia) fiber of about 2 to 6 μm in diameter [an example of the mat is Maftec (trade name) produced by Mitsubishi Chemical Corporation].

(4) Others

Figure 12B:
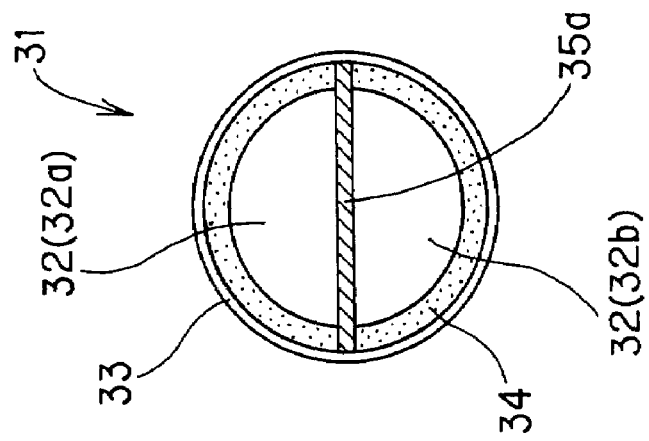
FIG. 12(a) is a side sectional view and FIG. 12(b) is a A-A' sectional view of FIG. 12(a).
Figure 12A:
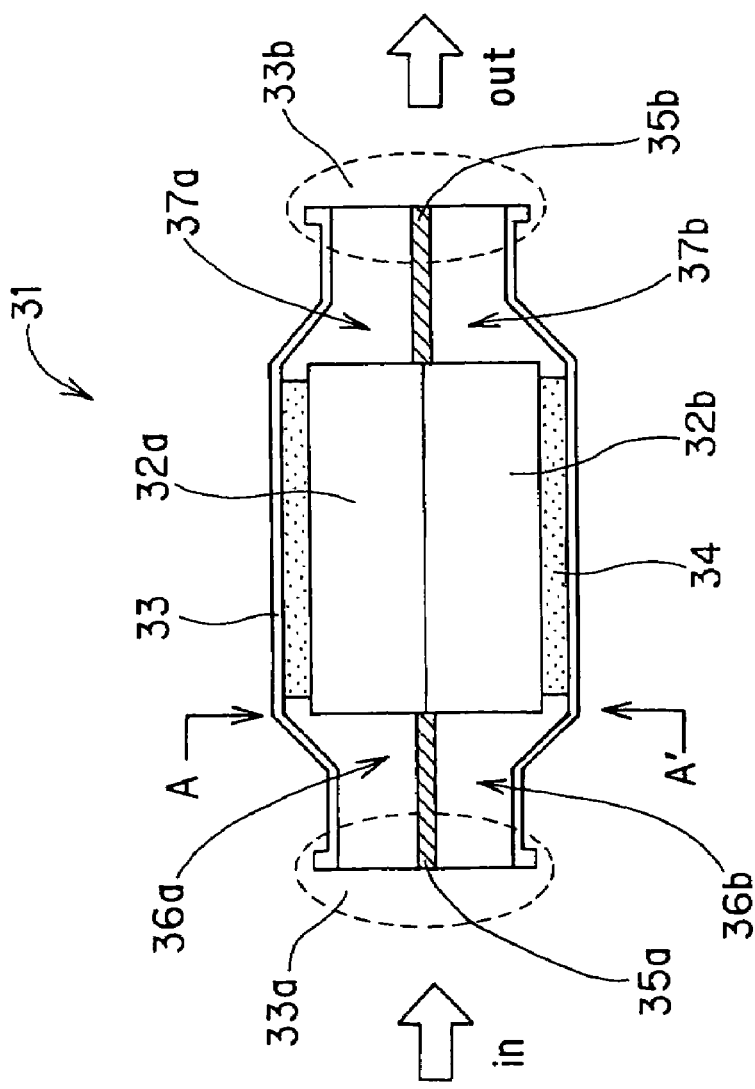

When, as in a catalytic converter 31 shown in FIG. 12(a) and FIG. 12(b), there is used a honeycomb catalyst body 32 which is a composite of at least two honeycomb catalyst body segments 32a and 32b, it is preferred to provide diaphragms 35a and 35b along the contacting areas of the at least two honeycomb catalyst body segments 32a and 32b. Since the contacting areas of the honeycomb catalyst body segments have high mechanical strengths and are strong as compared with other portions (ordinary partition walls) of the segments, there can be obtained the same effect as when the above-mentioned internal wall, plugged areas or thick partition walls have been formed in a honeycomb structure.

The honeycomb catalyst body 32 shown in FIG. 12(a) and FIG. 12(b) is a composite of two semi-columnar honeycomb catalyst body segments 32a and 32b. However, as to the shape of the composite, there is no particular restriction as long as the honeycomb catalyst body is a composite of at least two honeycomb catalyst body segments.

In the above, the at least two honeycomb catalyst body segments may be bonded to each other with, for example, a ceramic cement (e.g. a cement composed mainly of a ceramic fiber and a ceramic powder), or may be only abutted with each other without being bonded to each other.

When, as in a catalytic converter 31 shown in FIG. 13(a) and FIG. 13(b), there is used a honeycomb catalyst body 32 which is a laminate of a first honeycomb catalyst body 32c having a partition wall thickness of less than 0.27 mm (10.5 mil) and a second honeycomb catalyst body 32d having a partition wall thickness of 0.27 mm (10.5 mil) or more and which is held in a housing 33 so that the second honeycomb catalyst body 32d is provided at the exhaust gas-incoming section 33a side of the housing 33, it is preferred to provide a diaphragm 35a along some partition walls of the second honeycomb catalyst body 32d.

The honeycomb catalyst body having a partition wall thickness of 0.27 mm (10.5 mil) or more, as compared with the honeycomb catalyst body having a partition wall thickness of less than 0.27 mm (10.5 mil), is high in mechanical strengths and strong; therefore, there can be effectively prevented the generation of erosion (scraping) at the area of the honeycomb catalyst body contacting with the diaphragm.

Figure 14B:
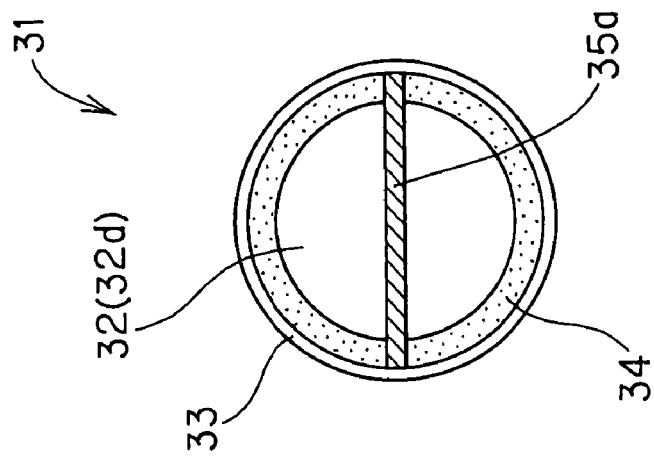
FIG. 14(a) is a side sectional view and FIG. 14(b) is a A-A' sectional view of FIG. 14(a).
Figure 14A:
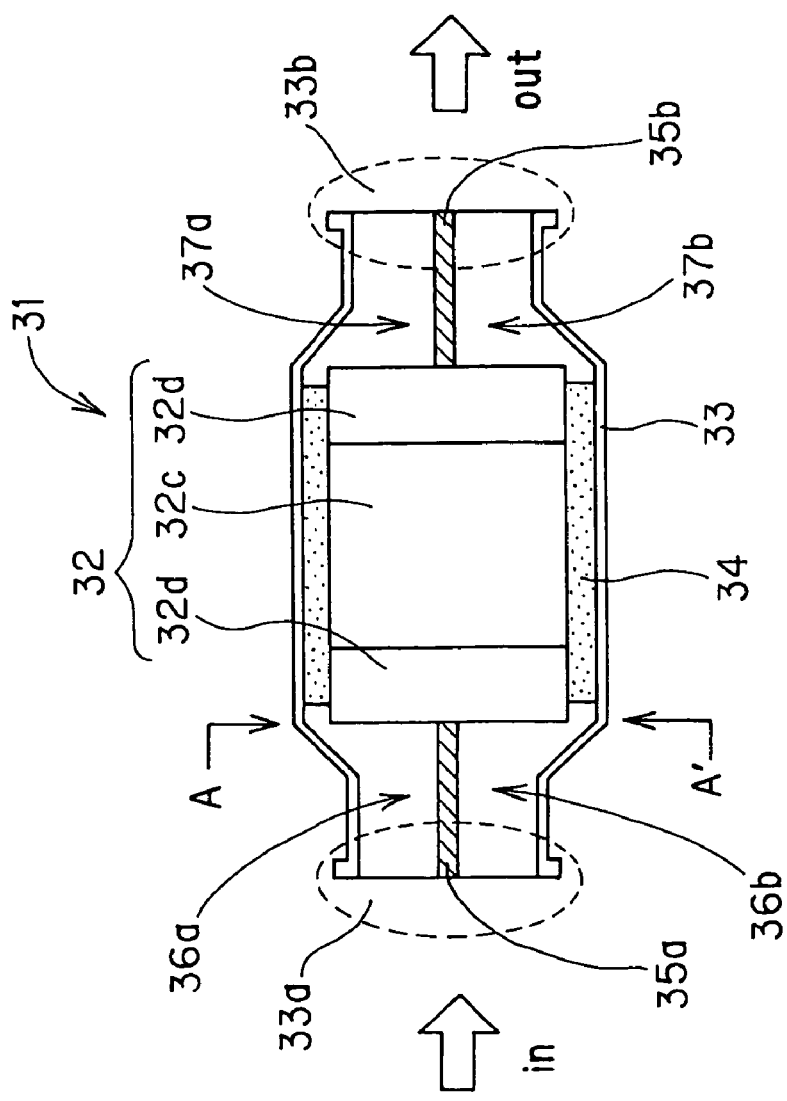

Even when, as in a catalytic converter 31 shown in FIG. 14(a) and FIG. 14(b), there is used a honeycomb catalyst body 32 which is a laminate of a first honeycomb catalyst body 32c having a partition wall thickness of less than 0.27 mm (10.5 mil) and two second honeycomb catalyst bodies 32d having a partition wall thickness of 0.27 mm (10.5 mil) or more, provided at the both sides of the first honeycomb catalyst body 32c and which is held in a housing 33 in such a state that the two second honeycomb catalyst bodies 32d are disposed at the exhaust gas-incoming section 33a side and purified gas-outgoing section 33b side of the housing 33, it is preferred to provide diaphragms 35a and 35b along some partition walls of the second honeycomb catalyst bodies 32d. Such a construction is preferred because erosion can be prevented not only at the exhaust gas-incoming section 33a side but also at the purified gas-outgoing section 33b side.

When there is used, as above, a honeycomb catalyst body which is a laminate of a first honeycomb catalyst body and two second honeycomb catalyst bodies provided at the both sides of the first honeycomb catalyst body, there is preferred a catalytic converter which is constructed, like a catalytic converter 31 shown in FIG. 15(a) and FIG. 15(b), in such a way that each of the second honeycomb catalyst bodies 32e has a first cutaway 38' communicating with part of the cells and a second cutaway 38" communicating with other cells, the housing 33 has a first exhaust gas-incoming section 33a', a second exhaust gas-incoming section 33a", a first purified gas-outgoing section 33b', and a second purified gas-outgoing section 33b", and the first cutaways 38' of the second honeycomb structures 32e communicate with the first exhaust gas-incoming section 33a' and first purified gas-outgoing section 33b' of the housing 33, and the second cutaways 38" of the second honeycomb structures 32e communicate with the second exhaust gas-incoming section 33a" and second purified gas-outgoing section 33b" of the housing 33.

In the above construction, since division of gas passages is made only by the second honeycomb catalyst bodies, no diaphragm (which causes erosion) is required. Further, since the second honeycomb catalyst bodies make a face contact with the first honeycomb catalyst body, the second honeycomb catalyst bodies cause no erosion. Therefore, the generation of erosion (scraping) in honeycomb catalyst body can be prevented more effectively.

Figure 16A:
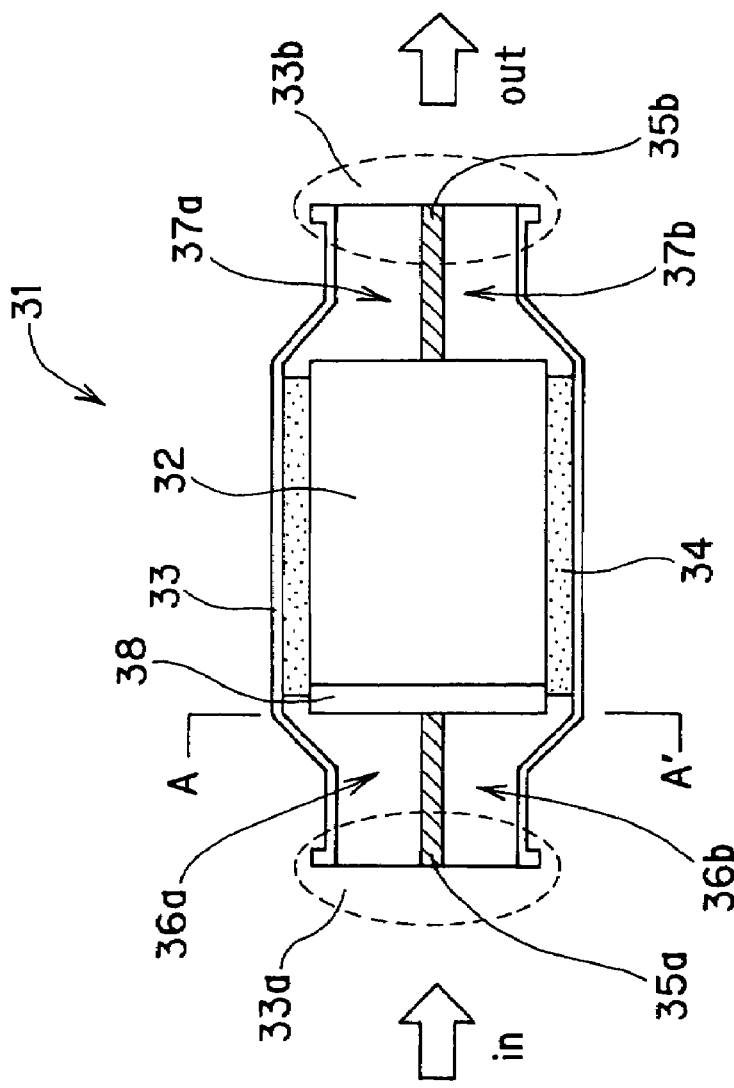
FIG. 16(a) is a side sectional view and FIG. 16(b) is a A-A' sectional view of FIG. 16(a).
Figure 16B:
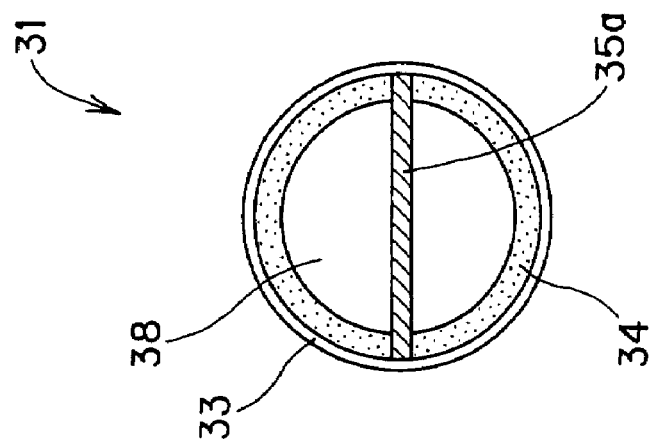

The same effect as in the catalytic converter 31 shown in FIG. 13(a) and FIG. 13(b) or in the catalytic converter 31 shown in FIG. 14(a) and FIG. 14(b) can be obtained also when, as in a catalytic converter 31 shown in FIG. 16(a) and FIG. 16(b), a metal- or ceramic-made reticulate material 38 is provided between a diaphragm 35a of a housing 33 and a honeycomb catalyst body 32. Incidentally, as the ceramic reticulate material, there can be suitably used, for example, a ceramic-made honeycomb structure of about 5 to 50 mm in thickness.

Figure 17A:
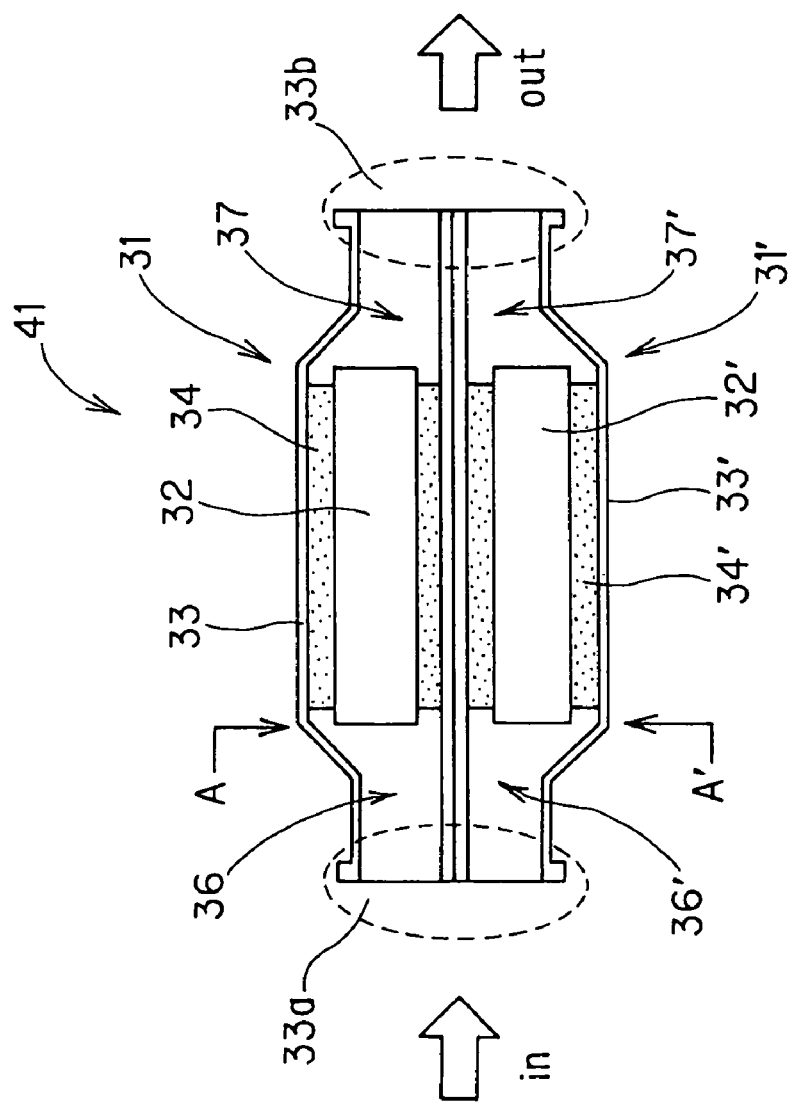
FIG. 17(a) is a side sectional view and FIG. 17(b) is a A-A' sectional view of FIG. 17(a).
Figure 17B:
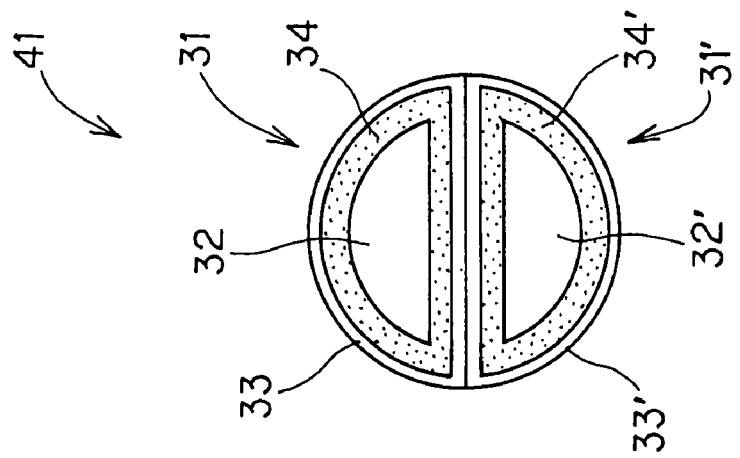

There is also preferred a composite catalytic converter like a catalytic converter 41 shown in FIG. 17(a) and FIG. 17(b), which has at least two catalytic converters 31 and 31' each having a honeycomb catalyst body 32 or 32', a housing 33 or 33' having an exhaust gas-incoming section 36 or 36' at one end and a purified gas-outgoing section 37 or 37' at the other end, and a holding material 34 or 34' and wherein the at least two catalytic converters 31 and 31' are integrated into one piece.

In the above construction, each catalytic converter of a composite catalytic converter holds at least two honeycomb catalyst bodies in a housing; at least two gas passages completely independent from each other are formed; and no diaphragm (which causes erosion) is necessary. Therefore, the generation of erosion (scraping) in honeycomb catalyst body can be prevented more effectively.

EXAMPLE

The present invention is described more specifically below by way of Examples. However, the present invention is in no way restricted by these Examples.

Example 1

As the honeycomb structure for constituting a honeycomb catalyst body, there was used a honeycomb structure made of cordierite, which had a circular end face shape of 100 mm in diameter, a length of 100 mm, a square cell shape of 1.27 mm×1.27 mm, a partition wall thickness of 110 µm (4 mil), a cell density of 62 cells/cm$^2$ (400 cells/in.$^2$) and an outer peripheral wall thickness of 0.3 mm and wherein an internal wall 5 of 0.3 mm in thickness, such as shown in FIG. 5(a) and FIG. 5(b) was formed at the central portion. That is, there was used a honeycomb structure wherein a large number of cells were divided by an internal wall into left and right two cell blocks.

Example 2

As the honeycomb structure for constituting a honeycomb catalyst body, there was used a honeycomb structure made of cordierite, which had a circular end face shape of 100 mm in diameter, a length of 100 mm, a square cell shape of 1.27 mm×1.27 mm, a partition wall thickness of 110 µm (4 mil), a cell density of 62 cells/cm$^2$ (400 cells/in.$^2$) and an outer peripheral wall thickness of 0.3 mm and wherein three thick partition walls 7 of 135 µm (5 mil) in thickness, such as shown in FIG. 7(a) and FIG. 7(b) were formed at the central portion. That is, there was used a honeycomb structure wherein a large number of cells were divided by thick partition walls into left and right two cell blocks.

Example 3

As the honeycomb structure for constituting a honeycomb catalyst body, there was used a laminate such as shown in FIG. 13(a) and FIG. 13(b), of a first honeycomb structure 32c made of cordierite, which had a circular end face shape of 100 mm in diameter, a length of 60 mm, a square cell shape of 1.27 mm×1.27 mm, a partition wall thickness of 110 μm (4 mil), a cell density of 62 cells/cm$^2$ (400 cells/in.$^2$) and an outer peripheral wall thickness of 0.3 mm and a second honeycomb structure 32d made of cordierite, which had a circular end face shape of 100 mm in diameter, a length of 20 mm, a square cell shape of 2.54 mm×2.54 mm, a partition wall thickness of 430 μm (17 mil), a cell density of 15.5 cells/cm$^2$ (100 cells/in.$^2$) and an outer peripheral wall thickness of 0.5 mm.

In lamination of the first honeycomb structure 32c and the second honeycomb structure 32d, the two honeycomb structures were disposed so that the partition walls of the central portions of the two honeycomb structures were contacted with each other.

Example 4

As the honeycomb structure for constituting a honeycomb catalyst body, there was used a laminate such as shown in FIG. 14(a) and FIG. 14(b), of a first honeycomb structure 32c made of cordierite, which had a circular end face shape of 100 mm in diameter, a length of 80 mm, a square cell shape of 1.27 mm×1.27 mm, a partition wall thickness of 110 μm (4 mil), a cell density of 62 cells/cm$^2$ (400 cells/in.$^2$) and an outer peripheral wall thickness of 0.3 mm and two second honeycomb structures 32d made of cordierite, provided at the two ends of the first honeycomb structure 32c, each of which had a circular end face shape of 100 mm in diameter, a length of 20 mm, a square cell shape of 2.54 mm×2.54 mm, a partition wall thickness of 430 μm (17 mil), a cell density of 15.5 cells/cm$^2$ (100 cells/in.$^2$) and an outer peripheral wall thickness of 0.5 mm.

In lamination of the first honeycomb structure 32c and the two second honeycomb structures 32d, the three honeycomb structures were disposed so that the partition walls of the central portions of the three honeycomb structures were contacted with each other.

On the partition walls of each of the honeycomb structures of Example 1 to Example 4 was wash-coated a catalyst solution containing a catalyst component, and then a heat treatment was applied at a high temperature for baking, to allow the honeycomb structure to carry an exhaust gas purification catalyst, whereby each honeycomb catalyst body was obtained. As the exhaust gas purification catalyst, there was used a three way catalyst containing a mixture of Pt and Rh.

As the housing for holding each of the above honeycomb catalyst bodies, there was used a housing such as a housing 33 shown in FIG. 4(a) and FIG. 4(b), which was cylindrical and 80 mm in inner diameter and had a cone-shaped exhaust gas-incoming section 33a at one end and a cone-shaped purified gas-outgoing section 33b at other end and wherein the exhaust gas-incoming section 33a and the purified gas-outgoing section 33b were divided by diaphragms 35a and 35b into two exhaust gas-incoming passages 36a and 36b and two purified gas-outgoing passages 37a and 37b. The cone-shaped exhaust gas-incoming section 33a and the cone-shaped purified gas-outgoing section 33b were detachable from the cylindrical portion of the housing, capable of holding the honeycomb catalyst body.

The housing main body and diaphragms were constituted by a plate of 2 mm in thickness, made of stainless steel (SUS 409).

As the holding material, there was used a non-intumescent ceramic mat [Maftec (trade name) produced by Mitsubishi Chemical Corporation] of 5 mm in thickness, made from an alumina fiber of 5 μm in diameter. As shown in FIG. 4(a) and FIG. 4(b), a holding material 34 was wound round the above-mentioned honeycomb catalyst body 32 and the resulting honeycomb catalyst body 32 was inserted into the above-mentioned housing 33, whereby was obtained a catalytic converter 31 wherein the holding material 34 was interposed between the outer surface of the honeycomb catalyst body 32 and the inner surface of the housing 33 and the honeycomb catalyst body 32 was held and fixed in the housing by the holding material 34. In holding the honeycomb catalyst body in the housing, diaphragms, particularly the edge portions thereof were disposed along the internal wall, thick partition walls or some partition walls of the second honeycomb catalyst(s).

The honeycomb structure of the present invention can be suitably used as a catalyst carrier in a honeycomb catalyst body which constitutes the catalytic converter of the present invention. The catalytic converter of the present invention can be suitably used as a catalytic converter in a multi-cylinder (e.g. four or six cylinder) engine.

What is claimed is:

1. A catalytic converter comprising
   a honeycomb catalyst body comprising a honeycomb structure as a catalyst carrier in which a large number of cells each functioning as a gas passage are formed by being surrounded by partition walls, and an exhaust gas purification catalyst carried on the partition walls of the honeycomb structure,
   wherein the honeycomb structure in which a large number of cells each functioning as a gas passage are formed by being surrounded by partition walls, wherein
   the partition walls are constituted by standard partition walls having a thickness of 0.27 mm or less, and
   thick partition walls each having a thickness larger than the thickness of the standard partition walls,
   the thick partition walls consist of the thickest partition wall and ordinary thick partition walls each having a thickness between the thickness of the thickest partition wall and the thickness of the standard partition walls,
   the ordinary thick partition walls are provided at the two sides of the thickest partition wall so that their thicknesses become gradually smaller as the ordinary thick partition walls are apart from the thickest partition wall, and
   the thickest partition wall is provided so as to divide the large number of cells into two or more cell blocks;
   a housing which is cylindrical, can hold the honeycomb catalyst body, and has an exhaust gas-incoming section at one end and a purified gas-outgoing section at the other end, and
   a holding material interposed between the outer surface of the honeycomb catalyst body and the inner surface of the housing,
   wherein
   the honeycomb catalyst body has, as the catalyst carrier, a honeycomb structure having an inner wall(s) which is (are) provided so as to divide the large number of cells into two or more cell blocks, and
   the exhaust gas-incoming section and purified gas-outgoing section of the housing are divided by diaphragms into two or more exhaust gas-incoming passages and two or more purified gas-outgoing passages and the diaphragms are provided along the inner wall(s) of the honeycomb structure, whereby the two or more cell blocks of the honeycomb structure are allowed to communicate with the corresponding two or more exhaust gas-incoming passages and corresponding two or more purified gas-outgoing passages of the housing;

wherein the contacting areas of the honeycomb structure to be connected with said diaphragms have been strengthened beforehand.

2. A catalytic converter comprising a honeycomb catalyst body comprising a honeycomb structure as a catalyst carrier in which a large number of cells each functioning as a gas passage are formed by being surrounded by partition walls, and an exhaust gas purification catalyst carried on the partition walls of the honeycomb structure, a housing which is cylindrical, can hold the honeycomb catalyst body, and has an exhaust gas-incoming section at one end and a purified gas-outgoing section at the other end, and a holding material interposed between the outer surface of the honeycomb catalyst body and the inner surface of the housing, wherein
the honeycomb catalyst body has, as the catalyst carrier, a honeycomb structure set forth in claim 1, and the exhaust gas-incoming section and purified gas-outgoing section of the housing are divided by diaphragms into two or more exhaust gas-incoming passages and two or more purified gas-outgoing passages and the diaphragms are provided along the thickest partition wall of the honeycomb structure, whereby the two or more cell blocks of the honeycomb structure are allowed to communicate with the corresponding two or more exhaust gas-incoming passages and corresponding two or more purified gas-outgoing passages of the housing.

3. A catalytic converter comprising a honeycomb catalyst body comprising a honeycomb structure as a catalyst carrier in which a large number of cells each functioning as a gas passage are formed by being surrounded by partition walls, and an exhaust gas purification catalyst carried on the partition walls of the honeycomb structure, a housing which is cylindrical, can hold the honeycomb catalyst body, and has an exhaust gas-incoming section at one end and a purified gas-outgoing section at the other end, and a holding material interposed between the outer surface of the honeycomb catalyst body and the inner surface of the housing, wherein the honeycomb catalyst body has, as the catalyst carrier, a honeycomb structure having, at the two ends, plugged areas which are formed so as to plug each two open ends of part of the large number of cells and divide the large number of cells into two or more cell blocks, wherein the exhaust gas-incoming section and purified gas-outgoing section of the housing are divided by diaphragms into two or more exhaust gas-incoming passages and two or more purified gas-outgoing passages and the diaphragms are provided along the plugged areas of the honeycomb structure, whereby the two or more cell blocks of the honeycomb structure are allowed to communicate with the corresponding two or more exhaust gas-incoming passages and corresponding two or more purified gas-outgoing passages of the housing, wherein the contacting areas of the honeycomb structure to be connected with said diaphragms have been strengthened beforehand, wherein the plugged areas are formed of cells that are plugged through the entire length of the cell, and wherein the plugged areas are formed into straight lines, in a cross-section substantially parallel to the axial direction, extending one to five adjacent cell rows in width, running from a first point on a peripheral wall to a second point on the peripheral wall.

4. A catalytic converter comprising a honeycomb catalyst body comprising a honeycomb structure as a catalyst carrier in which a large number of cells each functioning as a gas passage are formed by being surrounded by partition walls, and an exhaust gas purification catalyst carried on the partition walls of the honeycomb structure, a housing which is cylindrical, can hold the honeycomb catalyst body, and has an exhaust gas-incoming section at one end and a purified gas-outgoing section at the other end, and a holding material interposed between the outer surface of the honeycomb catalyst body and the inner surface of the housing, wherein
the honeycomb catalyst body has, as the catalyst carrier, a honeycomb structure which has, as the partition walls, standard partition walls having a thickness of 0.27 mm or less, and thick partition walls having a thickness larger than the thickness of the standard partition walls and wherein the thick partition walls are provided so as to divide the large number of cells into two or more cell blocks, and the exhaust gas-incoming section and purified gas-outgoing section of the housing are divided by diaphragms into two or more exhaust gas-incoming passages and two or more purified gas-outgoing passages and the diaphragms are provided along the thick partition walls of the honeycomb structure, whereby the two or more cell blocks of the honeycomb structure are allowed to communicate with the corresponding two or more exhaust gas-incoming passages and corresponding two or more purified gas-outgoing passages of the housing;

wherein the contacting areas of the honeycomb structure to be connected with said diaphragms have been strengthened beforehand.

5. A catalytic converter comprising a honeycomb catalyst body comprising a honeycomb structure as a catalyst carrier in which a large number of cells each functioning as a gas passage are formed by being surrounded by partition walls, and an exhaust gas purification catalyst carried on the partition walls of the honeycomb structure, a housing which is cylindrical, can hold the honeycomb catalyst body, and has an exhaust gas-incoming section at one end and a purified gas-outgoing section at the other end, and a holding material interposed between the outer surface of the honeycomb catalyst body and the inner surface of the housing, wherein
the honeycomb catalyst body is a laminate of a first honeycomb catalyst body having a partition wall thickness of less than 0.27 mm (10.5 mil) and two second honeycomb catalyst bodies having a partition wall thickness of 0.27 mm (10.5 mil) or more, provided at the both sides of the first honeycomb catalyst body, and is held in the housing in such a state that the two second honeycomb catalyst bodies are arranged at the exhaust gas-incoming section side and purified gas-outgoing section side of the housing, and the exhaust gas-incoming section and purified gas-outgoing section of the housing are divided by diaphragms into two or more exhaust gas-incoming passages and two or more purified gas-outgoing passages and the diaphragms are provided along the partition walls of the second honeycomb catalyst bodies, whereby the large number of cells of the second honeycomb structures are allowed to communicate with the two or more exhaust gas-incoming passages and two or more purified gas-outgoing passages of the housing, and wherein each of the second honeycomb catalyst bodies has a first cutaway communicating with part of the cells and a second cutaway communicating with other cells, the housing has first and second exhaust gas-incoming sections and first and second purified gas-outgoing sections, and the first cutaways of the second honeycomb structures communicate with the first exhaust gas-incoming section and first purified gas-outgoing section of the housing, and the second cutaways of the second honeycomb structures communicate with the second exhaust gas-incoming section and second purified gas-outgoing section of the housing.

6. A catalytic converter comprising a honeycomb catalyst body comprising a honeycomb structure as a catalyst carrier in which a large number of cells each functioning as a gas passage are formed by being surrounded by partition walls, and an exhaust gas purification catalyst carried on the partition walls of the honeycomb structure, a housing which is cylindrical, can hold the honeycomb catalyst body, and has an exhaust gas-incoming section at one end and a purified gas-outgoing section at the other end, and a holding material interposed between the outer surface of the honeycomb catalyst body and the inner surface of the housing, wherein the exhaust gas-incoming section and purified gas-outgoing section of the housing are divided by diaphragms into two or more exhaust gas-incoming passages and two or more purified gas-outgoing passages and there is interposed a metal-made reticulate material between each diaphragm and the honeycomb catalyst body.

* * * * *